US012783322B2

(12) United States Patent
Kinjo

(10) Patent No.: US 12,783,322 B2
(45) Date of Patent: Nov. 3, 2026

(54) CLUSTER, CLUSTER MANAGEMENT METHOD, AND CLUSTER MANAGEMENT PROGRAM

(71) Applicant: Hitachi, Ltd., Tokyo (JP)

(72) Inventor: Takayuki Kinjo, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 461 days.

(21) Appl. No.: 18/462,623

(22) Filed: Sep. 7, 2023

(65) Prior Publication Data

US 2024/0256363 A1 Aug. 1, 2024

(30) Foreign Application Priority Data

Feb. 1, 2023 (JP) ................................ 2023-014130

(51) Int. Cl.
*G06F 9/50* (2006.01)
*H04L 61/4511* (2022.01)

(52) U.S. Cl.
CPC ........ *G06F 9/5083* (2013.01); *H04L 61/4511* (2022.05)

(58) Field of Classification Search
CPC .......................... G06F 9/5083; H04L 61/4511
USPC .......................................................... 718/104
See application file for complete search history.

(56) References Cited

U.S. PATENT DOCUMENTS

2001/0014097 A1* 8/2001 Beck .................. H04L 67/1014 370/401
2008/0031601 A1* 2/2008 Hashimoto ........ H04N 21/6581 348/E7.071
2013/0067188 A1* 3/2013 Mehra .................. G06F 3/0689 711/170
2016/0191310 A1* 6/2016 Brandwine ......... H04L 12/1836 709/220
2016/0292037 A1* 10/2016 Kandukuri .............. G06F 16/27
2018/0159929 A1* 6/2018 Heckle ................ H04L 67/1095
2020/0106738 A1* 4/2020 Rajvaidya ........... H04L 43/0817
2021/0119940 A1* 4/2021 Kumar ................ G06F 11/1443
2023/0075894 A1* 3/2023 Walters .................. H04L 41/12

FOREIGN PATENT DOCUMENTS

JP 2019-056986 A 4/2019

* cited by examiner

*Primary Examiner* — Tuan C Dao
(74) *Attorney, Agent, or Firm* — Volpe Koenig

(57) ABSTRACT

A cluster includes a plurality of nodes including a storage unit that stores a program to be executed in response to a request from a client terminal connected to a network, and a processor that executes the program, in which, in a case where at least one substitute program stored in a substitute cluster is executed as a substitute for at least one target program stored in the cluster, when a request to the target program transmitted from the client terminal is acquired, a request transfer process of transferring the request to the target program to the substitute cluster is executed such that the substitute program is executed in response to the request to the target program.

10 Claims, 16 Drawing Sheets

FIG. 4

| RECEPTION TIME (401) | TRANSMISSION SOURCE HOST (402) | TRANSFER SOURCE PORT (403) | DESTINATION HOST (404) | DESTINATION PORT (405) | REQUEST METHOD (406) | REQUEST URL (407) |
|---|---|---|---|---|---|---|
| 2022/09/01 23:45:12 | 192.168.100.10 | 60001 | app1.example.com | 443 | GET | https://app1.example.com/xxx |
| 2022/09/01 23:45:14 | 192.168.100.20 | 60002 | app2.example.com | 443 | POST | https://app2.example.com/yyy |
| ... | ... | ... | ... | ... | ... | ... |

CLUSTER, CLUSTER MANAGEMENT METHOD, AND CLUSTER MANAGEMENT PROGRAM

BACKGROUND OF THE INVENTION

1. Field of the Invention

The present invention relates to a cluster, a cluster management method, and a cluster management program.

2. Description of the Related Art

A system called a cluster is used. A cluster is a system that causes a plurality of computers to operate as if they were one computer. Often, a cluster is connected to a network. A user can connect a client terminal to the cluster via the network, operate the client terminal, and use software of the cluster.

Even in a case where some of the computers that are constituents of the cluster fail and stop due to a failure or the like, the user can use the cluster by using the client terminal. The user can use the cluster by using the client terminal while repairing or replacing the failed computer.

A program operating on a server that is a constituent of a cluster may be changed. For example, there is a case where an operating system of a server is updated, an application of the server is updated, or new software is introduced into the server. There is a technique for curbing the occurrence of problems when a configuration of a program operating on a server of the cluster is changed. For example, in a technique disclosed in JP 2019-56986 A, in a case where a container image of a newer version than a version of a container image being used is released in an active server using a container, the container image of the newer version is used in a verification server. In the technique disclosed in JP 2019-56986 A, at that time, an operation of the container image of the new version is monitored and verified. Therefore, by using the technique disclosed in JP 2019-56986 A, it is possible to verify whether a container image of a newer version than a version used in an active server can be used without problems before the container image of the newer version is used in the active server.

SUMMARY OF THE INVENTION

Incidentally, in the technique disclosed in JP 2019-56986 A, a case where the active server is switched to another server in which a part of the configuration of the active server is changed and the other server is used is not assumed. Therefore, even if the technique disclosed in JP 2019-56986 A is used, it is not possible to cope with a problem that occurs in a case where the active server is switched to another server in which a part of the configuration of the active server is changed and the other server is used.

For example, conventionally, in a case where a first cluster is switched to a second cluster and used, a DNS record (hereinafter, referred to as a "first DNS record") corresponding to the domain name of the first cluster stored in a DNS server is rewritten as follows. Before the switching, the domain name of the first cluster and an IP address of the first cluster are stored in association with each other in the first DNS record of the DNS server. When a client terminal attempts to access the first cluster by using the domain name of the first cluster, the IP address of the first cluster that is stored in the first DNS record of the DNS server is referred to, and the client terminal can access the first cluster.

At the time of switching, the domain name of the first cluster and the IP address of the second cluster are stored in association with each other in the first DNS record of the DNS server. As a result, in a case where the client terminal attempts to access the first cluster by using the domain name of the first cluster, the IP address of the second cluster that is stored in the first DNS record of the DNS server is referred to, and the client terminal can access the second cluster. As described above, by changing the IP address stored in the first DNS record, it is possible to perform switching from the first cluster to the second cluster.

Incidentally, there are many DNS servers. It is not easy to immediately change the first DNS records of all the DNS servers. Until the change of the first DNS records of all the DNS servers is completed, the client terminal may try to access the first cluster by using the domain name of the first cluster by referring to the first DNS record of the DNS server of which the first DNS record has not been changed, and access the first cluster. Therefore, even if the first DNS records of some DNS servers are rewritten, switching from the first cluster to the second cluster is not completed until the change of the first DNS records of all the DNS servers is completed.

The client terminal usually has a cache that stores a DNS record. Until the change of the first DNS record stored in the cache is completed, the client terminal accesses the first cluster when trying to access the first cluster. That is, the switching from the first cluster to the second cluster is not completed until the change of the first DNS record stored in the cache of the client terminal is completed.

As described above, in the conventional cluster switching method, even if a DNS record of a DNS server is changed, there is a possibility that the cluster switching will not be able to be completed immediately. In the conventional method for switching clusters, although switching in units of clusters can be performed, switching in units of applications (programs) cannot be performed.

Therefore, an object of the present invention is to provide a cluster, a cluster management method, and a cluster management program capable of performing cluster switching more quickly.

In order to achieve the above object, according to an aspect of the present invention, there is provided a cluster management method in a cluster including a plurality of nodes each including a storage unit that stores a program to be executed in response to a request from a client terminal connected to a network and a processor that executes the program, the cluster management method of causing the processor to: in a case where at least one substitute program stored in a substitute cluster is executed as a substitute for at least one target program stored in the cluster, when a request to the target program transmitted from the client terminal is acquired, execute a request transfer process of transferring the request to the target program to the substitute cluster such that the substitute program is executed in response to the request to the target program.

According to another aspect of the present invention, there is provided a cluster including a plurality of nodes including a storage unit that stores a program to be executed in response to a request from a client terminal connected to a network; and a processor that executes the program, in which, in a case where at least one substitute program stored in a substitute cluster is executed as a substitute for at least one target program stored in the cluster, when a request to the target program transmitted from the client terminal is acquired, a request transfer process of transferring the request to the target program to the substitute cluster is executed such that the substitute program is executed in response to the request to the target program.

According to a representative embodiment of the present invention, cluster switching can be performed more quickly. Problems, configurations, and effects other than those described above will become apparent by the following description of embodiments.

BRIEF DESCRIPTION OF THE DRAWINGS

FIG. 4 is a diagram illustrating an example of data stored in a request queue;

DESCRIPTION OF THE PREFERRED EMBODIMENTS

Figure 1:
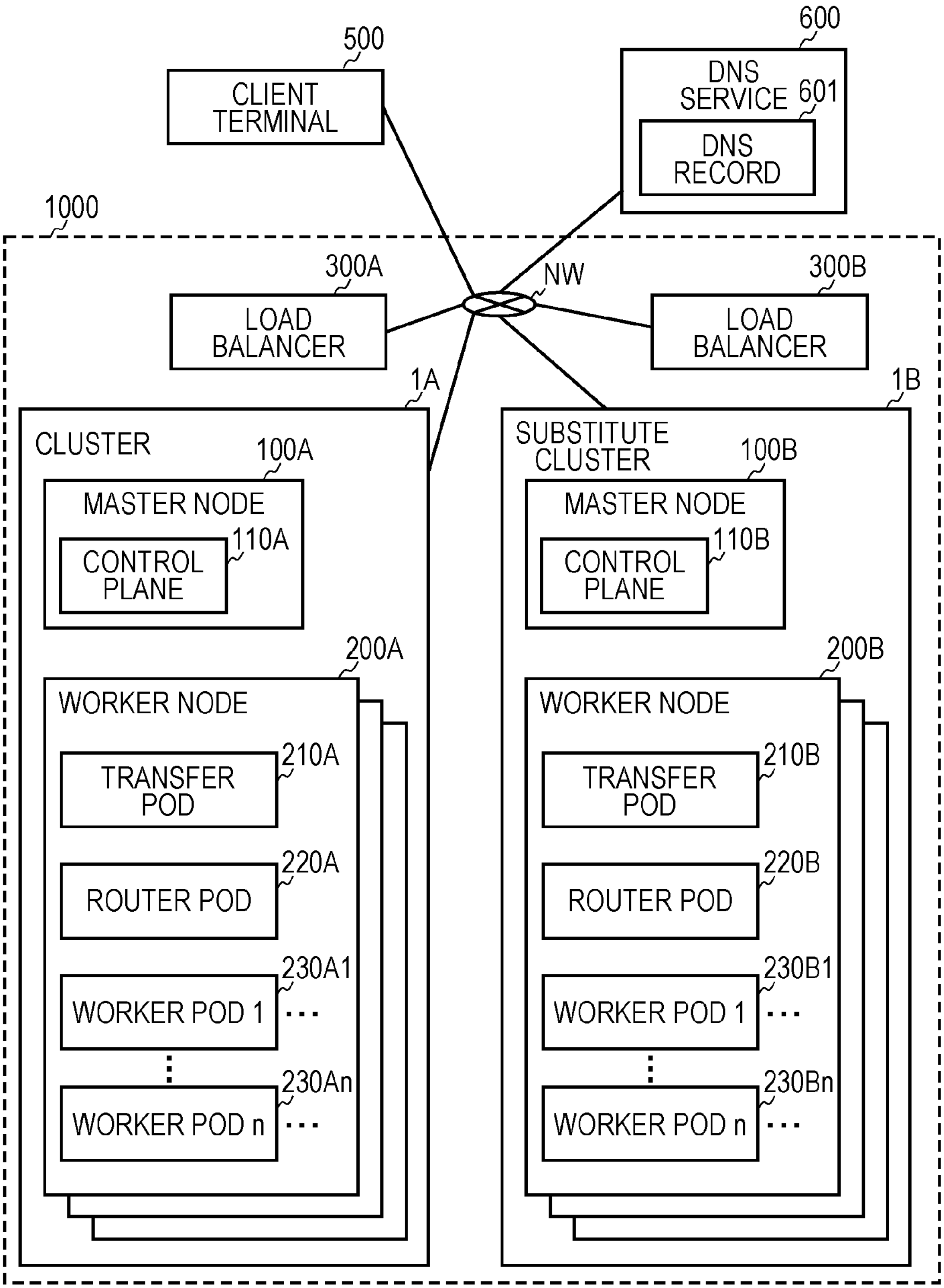
FIG. 1 is a block diagram illustrating an outline of a configuration of a cluster system according to an embodiment.

Hereinafter, embodiments of the present invention will be described with reference to the drawings. However, the present invention is not to be construed as being limited to the description of the following embodiments. Those skilled in the art can easily understand that a specific configuration can be changed without departing from the spirit or concept of the present invention.

In the configurations of the invention described below, the same or similar configurations or functions are denoted by the same reference numerals, and redundant description will be omitted.

Notations such as "first", "second", and "third" in the present specification and the like are attached to identify constituents, and do not necessarily limit the number or order.

In the present specification and the like, as an example of various types of information, an expression of an "XX table" may be described, but the various types of information may be expressed by a data structure such as an "XX list" or an "XX queue". The "XX table" may be "XX information". In describing identification information, expressions such as "identification information", an "identifier", a "name", an "ID", and a "number" are used, but these can be replaced with each other.

<<System Configuration>>

FIG. 1 is a block diagram illustrating an outline of a configuration of a cluster system 1000 according to an embodiment. As illustrated in FIG. 1, the cluster system 1000 includes a cluster 1A, a load balancer 300A, a substitute cluster 1B, and a load balancer 300B. The cluster system 1000 is connected to client terminals 500 and 600 via a network NW.

A cluster is a system that causes a plurality of computers to operate as if they were one computer. The cluster has a plurality of nodes. The node is a virtual or physical computer. A container and a pod are created in the node. The container is a virtual OS environment including software. The pod also includes one or more containers. Some pods include one or more volumes.

The cluster 1A is connected to the load balancer 300A, the client terminal 500, the DNS server 600, and the substitute cluster 1B via the network NW. The substitute cluster 1B is a cluster used as a substitute for the cluster 1A. The substitute cluster 1B has the same configuration as the cluster 1A.

The cluster 1A includes one master node 100A and a plurality of worker nodes 200A. The cluster 1A is a kind of cluster. In the present embodiment, the cluster 1A is, as an example of a cluster, a cluster that creates a virtual OS environment (container) in the form of a pod in a plurality of servers and operates the virtual OS environment.

The master node 100A and the worker node 200A are nodes, and include a storage device and a processor. The master node 100A and the worker node 200A can be realized by a general information processing apparatus such as a PC or a server computer. It is sufficient that there is one or more worker nodes 200A.

The master node 100A manages a plurality of worker nodes 200A. As illustrated in FIG. 1, in each of the worker nodes 200A, a transfer pod 210A, a router pod 220A, and worker pods 230A1 to 230An are created (deployed) as pods. The worker pods 230A1 to 230An are collectively referred to as a "worker pod 230A". The number of each of the worker pods 230A1 to 230An may be one or more.

The master node 100A includes a control plane 110A that manages pods (the transfer pod 210A, the router pod 220A, or the worker pod 230A) of the plurality of worker nodes 200A. A program configuring the control plane 110A is realized by executing one or more programs.

The transfer pod 210A is a pod that transfers a request from the client terminal 500 for the worker pod 230A to the substitute cluster 1B in a case where the substitute cluster 1B is used as a substitute for the cluster 1A. The router pod 220A is a pod that transfers a request from the client terminal 500 to the worker pod 230A on which a load is relatively low. A transfer destination of the router pod 220A may be the worker pod 230A of the worker node 200A other than the worker node 200A in which the router pod 220A is created.

The worker pod 230A includes a program and is a pod that executes processing in response to a request from the client terminal 500. The transfer pod 210A and the transfer pod 210B of the substitute cluster 1B will be collectively referred to as a "transfer pod 210". The router pod 220A and the router pod 220B of the substitute cluster 1B will be collectively referred to as a "router pod 220".

The load balancer 300A transfers a request from the client terminal 500 to the worker node 200A with a relatively low load. The load balancer 300A and the load balancer 300B will be collectively referred to as a "load balancer 300".

An IP address is assigned to each of the master node 100A and the worker node 200A, the load balancers 300A and 300B, the client terminal 500, and the DNS server 600. A port number is assigned to each pod (the transfer pods 210A and 210B, the router pods 220A and 220B, and the worker pods 230A and 230B) created in the node.

A domain name (for example, "example.com") is assigned to the cluster 1A. The same subdomain name (for example, "app1") is assigned to the worker pod 230A having the same configuration among the plurality of worker pods 230A.

In the DNS server 600, the domain name (for example, "example.com") of the cluster 1A is associated with the IP address of the load balancer 300A. The domain name of the worker pod 230A is a domain name (for example, "app1.example.com") obtained by adding the subdomain name of the worker pod 230A to the domain name of the cluster 1A. Among the worker pods 230A1 to 230An, the worker pod 230 used by a user can be designated by the domain name (for example, "app1.example.com") of the worker pod 230.

The DNS server 600 stores a DNS record 601 including information in which the IP address of the cluster is associated with the domain name of the cluster. In FIG. 1 and the like, the DNS record 601 related to the cluster 1A is illustrated by omitting a large number of DNS records.

The network NW may be a wired network or a wireless network. The network NW may be a global network such as the Internet.

The user may execute the program of the worker pod 230A by operating the client terminal 500 as follows. Here, information including a command for the program of the worker pod 230A and the domain name of the worker pod 230A will be referred to as a "request to the worker pod 230A".

The user operates the client terminal 500 to transmit a request to the worker pod 230A to a destination designated by the domain name (for example, "app1.example.com") of the worker pod 230A. Then, the request to the worker pod 230B is transmitted to the load balancer 300A with reference to the DNS server 600 and the like.

Upon receiving the request to the worker pod 230A, the load balancer 300A transfers the request to the worker pod 230A to the worker node 200A with a relatively low load among the worker nodes 200A.

In the worker node 200A, normally, the router pod 220A receives the request to the worker pod 230A, and transmits the request to the worker pod 230A to the worker pod 230A with a relatively low load among the worker pods 230A designated in the request to the worker pod 230A.

In a case where the worker pod 230A receives the request to the worker pod 230A, the program of the worker pod 230A executes processing according to the request to the worker pod 230A.

The substitute cluster 1B may be used instead of the cluster 1A, and if the substitute cluster 1B is not problematic, the substitute cluster 1B may be used instead of the cluster 1A. As described above, in a case where the substitute cluster 1B is used instead of the cluster 1A, as will be described in detail below, in the worker node 200A, the transfer pod 210A receives the request to the worker pod 230A instead of the router pod 220A receiving the request.

Similarly to the cluster 1A, the substitute cluster 1B includes a master node 100B having a control plane 110B and a worker node 200B having a transfer pod 210B, a router pod 220B, and a worker pod 230B (230B1 to 230Bn).

Figure 2:
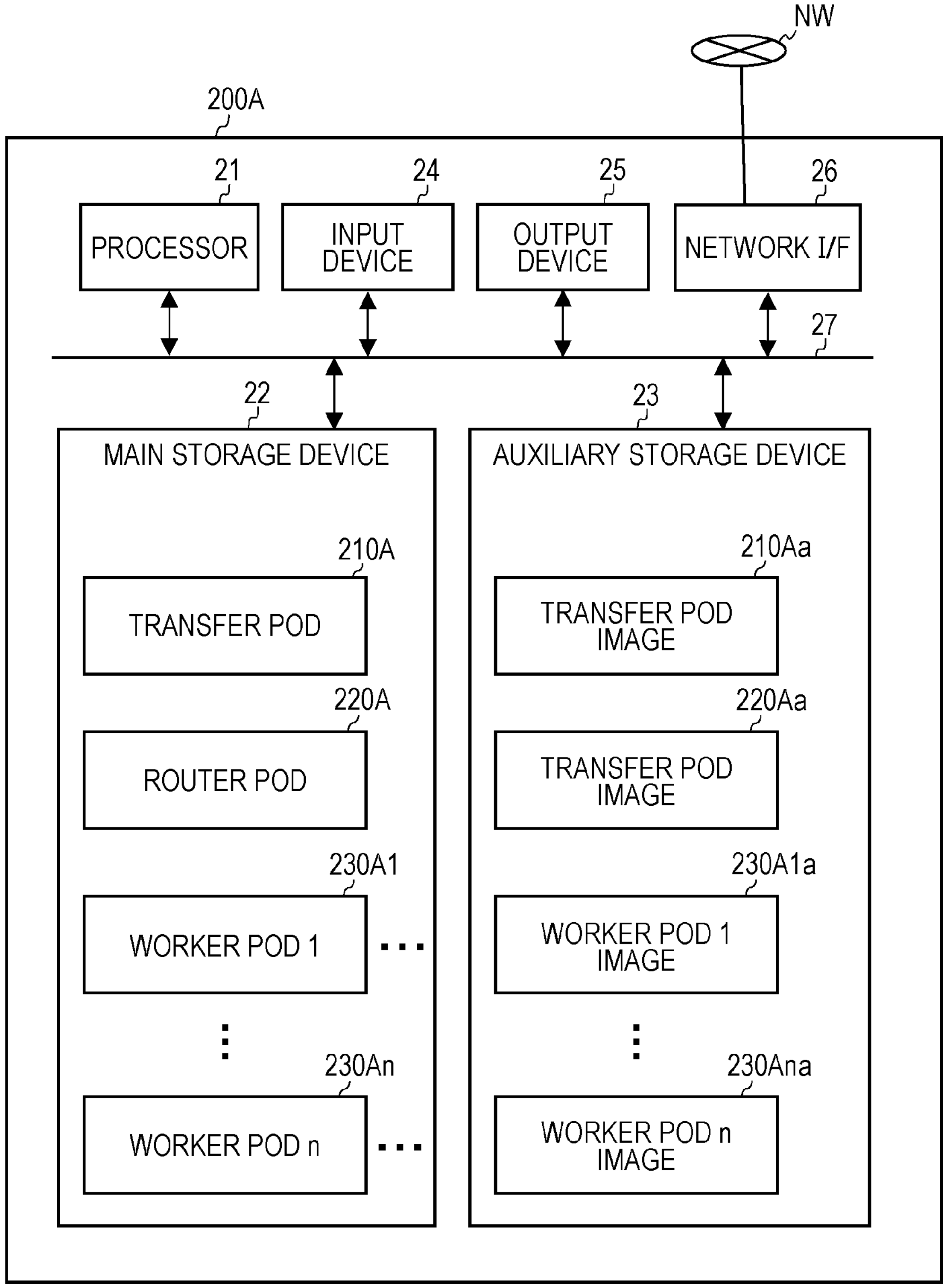
FIG. 2 is a block diagram illustrating a hardware configuration example of a worker node.

<Hardware Configuration of Worker Node 200A, FIG. 2>

FIG. 2 is a block diagram illustrating a hardware configuration example of the worker node 200A. As illustrated in FIG. 2, the worker node 200A includes a processor 21, a main storage device 22, a subsidiary storage device 23, an input device 24, an output device 25, a network I/F 26, and a bus 27 that connects these devices. The worker node 200A can be realized by a general information processing apparatus such as a PC or a server computer.

The processor 21 reads data and a program stored in the subsidiary storage device 23 to the main storage device 22, and executes processing defined by the program. The transfer pod 210A described above with reference to FIG. 1 is obtained by deploying (disposing) a transfer pod image 210Aa stored in the subsidiary storage device 23 in the main storage device 22. Similarly, the router pod 220A and the worker pods 230A1 to 230An are obtained by deploying (disposing) a router pod image 220Aa and worker pod images 230A1*a* to 230Ana stored in the subsidiary storage device 23 to the main storage device 22. Deployment of these pods (the transfer pod 210A, the router pod 220A, and the worker pods 230A1 to 230An) is executed in response to an instruction from the control plane 110A of the master node 100A.

The transfer pod image 210Aa, the router pod image 220Aa, and the worker pod images 230A1*a* to 230Ana are stored in the worker node 200A. A location where the transfer pod image 210Aa, the router pod image 220Aa, and the worker pod images 230A1*a* to 230Ana are stored may be any location that can be read out by the control plane 110A.

The main storage device 22 includes a volatile storage element such as a RAM, and stores a program executed by the processor 21 and data.

The subsidiary storage device 23 is a device that includes a nonvolatile storage element such as a hard disk drive (HDD) or a solid state drive (SSD), and stores a program, data, or the like. The subsidiary storage device 23 stores the transfer pod image 210Aa, the router pod image 220Aa, the worker pod images 230A1*a* to 230Ana, and the like.

The input device 24 is a device that receives a user's operation using a keyboard, a mouse, or the like, and acquires information input through the user's operation. The output device 25 is a device that outputs information, such as a display, and presents the information to the user according to display on a screen, for example. Note that the worker node 200A may include a touch panel that also serves as the input device 24 and the output device 25.

The network I/F 26 is an interface (transmission/reception device) that can transmit and receive data to and from devices such as the master node 100A, the load balancers 300A and 300B, the substitute cluster 1B, the client terminal 500, and the DNS server 600 via the network NW. The worker node 200A can transmit and receive data to and from devices such as the master node 100A, the load balancers 300A and 300B, the substitute cluster 1B, the client terminal 500, and the DNS server 600 connected to the network NW by using the network I/F 26.

The master node 100A, the master node 100B and the worker node 200B of the substitute cluster 1B, the load balancers 300A and 300B, the client terminal 500, and the DNS server 600 can be realized by a general information processing apparatus such as a PC or a server computer, for example, as with the worker node 200A.

Figure 3:
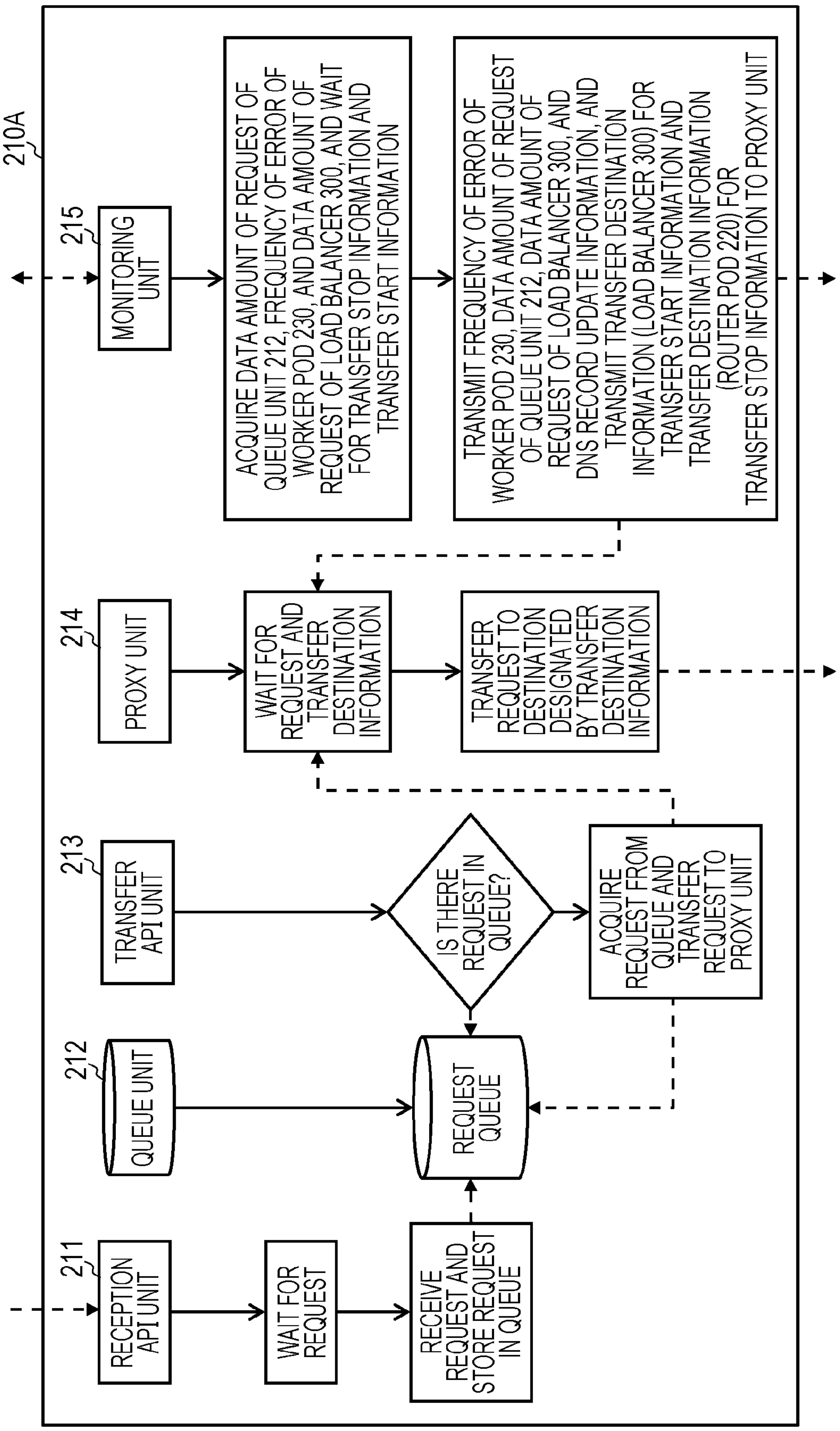
FIG. 3 is a block diagram illustrating a functional configuration example of a worker pod.

<Configuration of Transfer Pod 210A, FIG. 3>

FIG. 3 is a block diagram illustrating an outline of a configuration of the transfer pod 210A. As illustrated in FIG. 3, the transfer pod 210A includes a reception API unit 211, a queue unit 212, a transfer API unit 213, a proxy unit 214, and a monitoring unit 215.

The reception API unit 211 receives the request to the worker pod 230A transmitted toward the transfer pod 210A. The reception API unit 211 waits for reception of the request to the worker pod 230A. Upon receiving the request to the worker pod 230A, the reception API unit 211 stores the received request to the worker pod 230A in a request queue of the queue unit 212.

The queue unit 212 has the request queue for storing the request to the worker pod 230A. The queue unit 212 transmits the request to the worker pod 230A stored in the request queue to the transfer API unit 213 in response to an inquiry from the transfer API unit 213.

FIG. 4 is a diagram illustrating an example of data stored in the request queue. As illustrated in FIG. 4, the information stored in the request queue includes a reception time 401 at which a request to the worker pod 230A is received, an address 402 of a transmission source host that has transmitted the request to the worker pod 230A, a port number 403 of a transfer source that has transferred the request to the worker pod 230A to the transfer pod 210A, a destination host 404 that is a domain name of the worker pod 230A that is a transfer destination, a destination port 405 that is a port number of the worker pod 230A that is a transfer destination, a request method 406 that is a command for the worker pod 230A included in the request to the worker pod 230A, and a request URL 407 related to the domain name of the worker pod 230A.

As illustrated in FIG. 3, the transfer API unit 213 inquires whether an unprocessed request to the worker pod 230A is stored in the request queue of the queue unit 212. In a case where an unprocessed request to the worker pod 230A is stored in the request queue, the transfer API unit 213 acquires the unprocessed request to the worker pod 230A from the request queue and transmits the request to the proxy unit 214.

The proxy unit 214 receives the request to the worker pod 230A from the transfer API unit 213. The received request to the worker pod 230A is transferred to a transmission destination of the request to the worker pod 230A calculated on the basis of transfer destination information transmitted from the monitoring unit 215.

The monitoring unit 215 monitors the queue unit 212, the worker pod 230A, and the load balancer 300A. That is, the monitoring unit 215 acquires, from the queue unit 212, a data amount of the unprocessed request to the worker pod 230A accumulated in the request queue of the queue unit 212. The monitoring unit 215 acquires, from the worker pod 230A, the frequency of errors generated by executing the program of the worker pod 230A. The monitoring unit 215 acquires, from the load balancer 300A, a data amount of the request to the worker pod 230A (a request to a target program) transmitted from the client terminal 500 to the load balancer 300A (cluster 1A).

Upon receiving information indicating that a transfer destination of the unprocessed request to the worker pod 230A is the "load balancer 300", the monitoring unit 215 transmits, to the proxy unit 214, transfer destination information indicating that the transfer destination of the unprocessed request to the worker pod 230A is the "load balancer 300". Similarly, upon receiving information indicating that a transfer destination of the unprocessed request to the worker pod 230A is the "router pod 220A", the monitoring unit 215 transmits, to the proxy unit 214, transfer destination information indicating that the transfer destination of the unprocessed request to the worker pod 230A is the "router pod 220A".

<<Processing Procedure>>

Next, (A) a procedure of switching the cluster 1A to the substitute cluster 1B (refer to FIGS. 6 to 11) and (B) a procedure of switching the worker pod 230Ax of the cluster 1A to the worker pod 230B of the substitute cluster 1B (refer to FIGS. 12 to 16) will be described.

Figure 5:
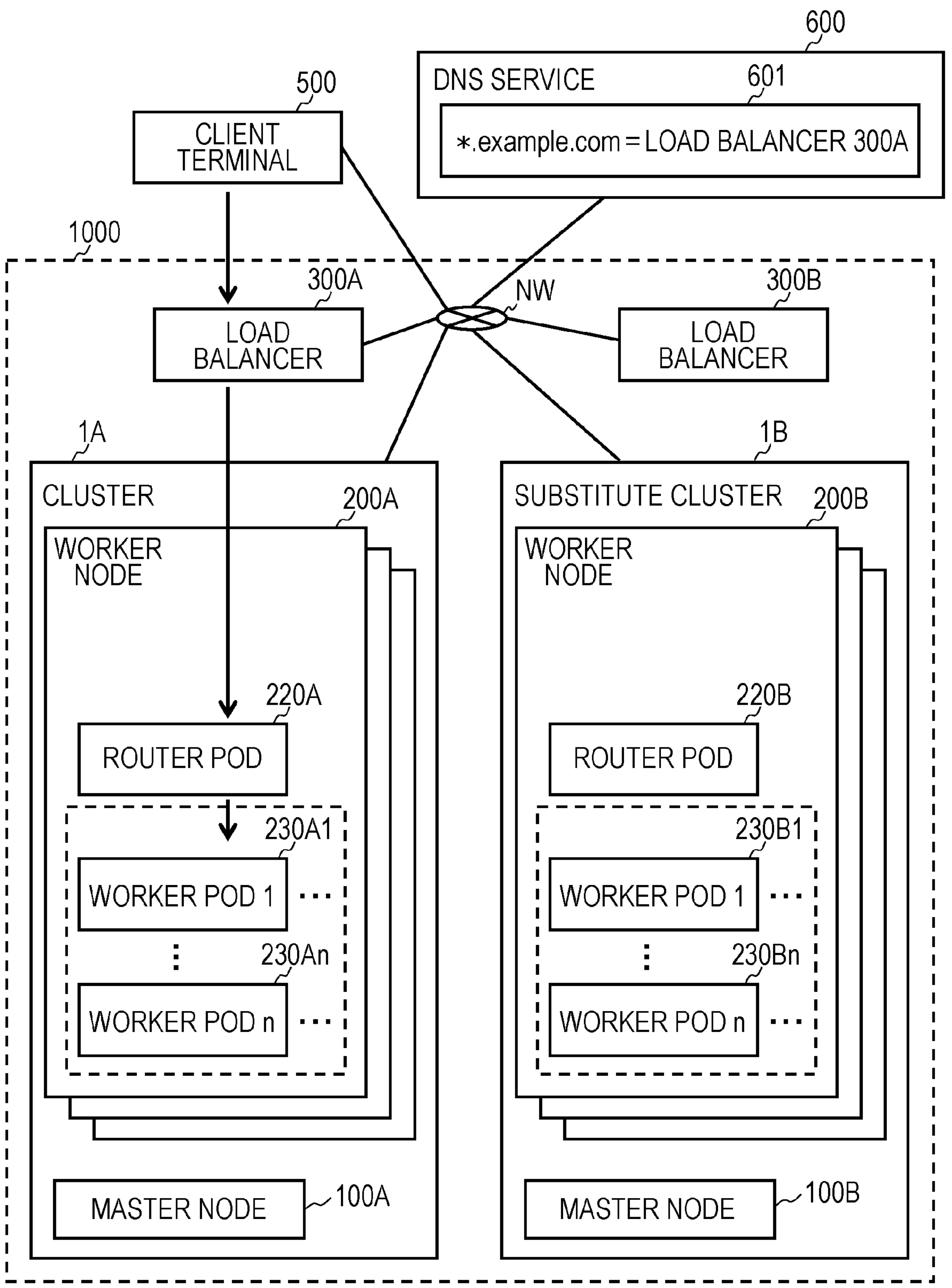
FIG. 5 is an explanatory diagram for describing a configuration in a state in which a cluster is used and a substitute cluster is not used (state before switching)

FIG. 5 is an explanatory diagram illustrating a configuration in a state in which the cluster 1A is used and the substitute cluster 1B is not used (state before switching). As illustrated in FIG. 5, in the state before switching, the transfer pods 210 (transfer pods 210A and 210B) are not created in the cluster 1A and the substitute cluster 1B.

<(A) Procedure of Switching the Cluster 1A to the Substitute Cluster 1B, FIGS. 6 to 11>

(A) A case where the cluster 1A is switched to the substitute cluster 1B includes the following cases. For example, in order to update a container base of the cluster 1A, a system in which the container base of the cluster 1A is updated may be constructed in the substitute cluster 1B. As described below, the substitute cluster 1B is experimentally used instead of the cluster 1A, and if there is no problem in the substitute cluster 1B, the substitute cluster 1B is used instead of the cluster 1A.

As preparation for switching the cluster 1A to the substitute cluster 1B, after changing of a setting or a configuration of the substitute cluster 1B is completed, the cluster 1A can be switched to the substitute cluster 1B in (A) the procedure of switching the cluster 1A to the substitute cluster 1B described below.

Figure 6:
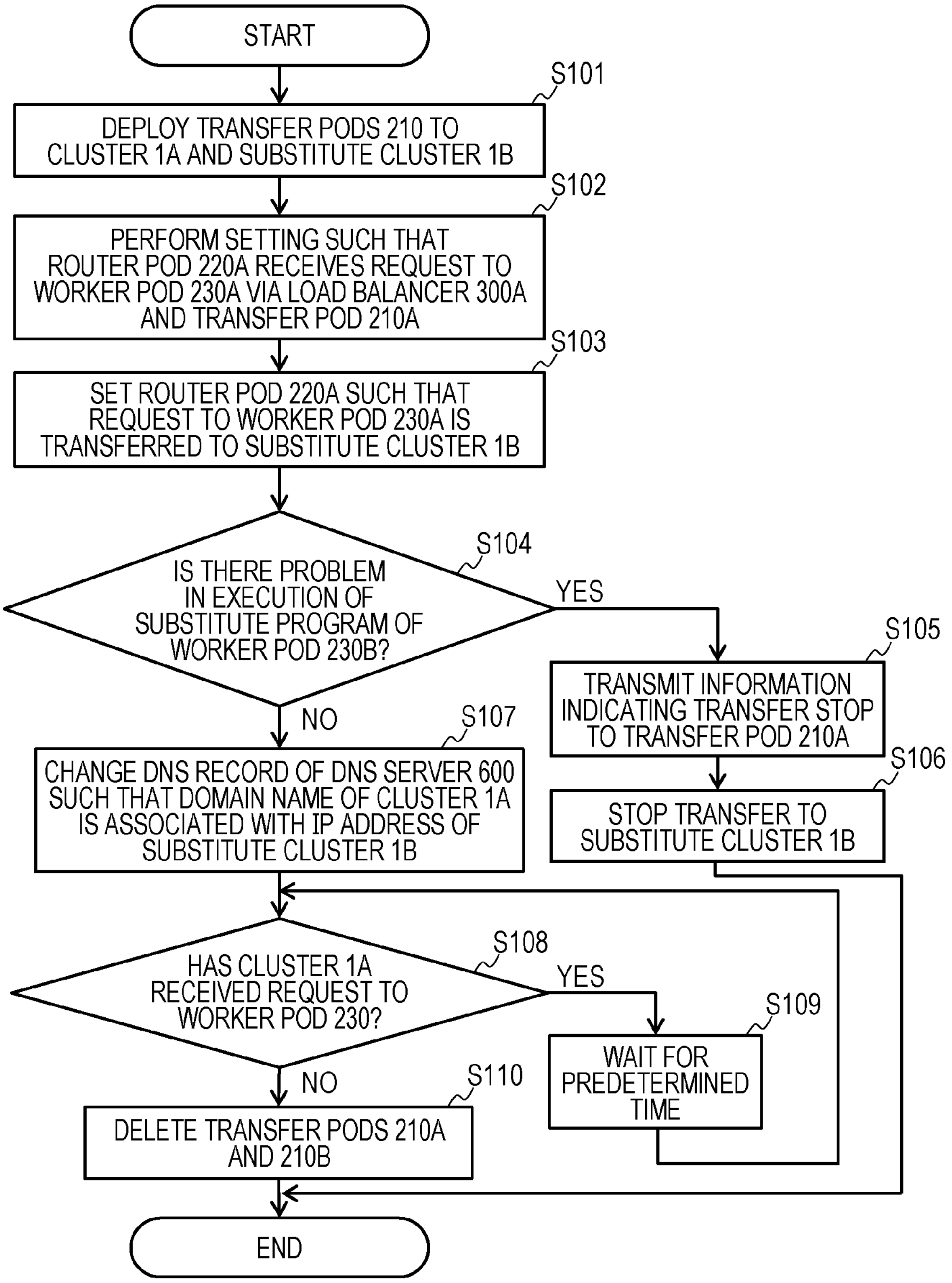
FIG. 6 is a flowchart illustrating an example of (A) a procedure of switching the cluster to the substitute cluster according to the embodiment.

FIG. 6 is a flowchart illustrating an example of (A) the procedure of switching the cluster 1A to the substitute cluster 1B.

First, the transfer pod 210A is deployed to the cluster 1A, and the transfer pod 210B is deployed to the substitute cluster 1B (step S101). That is, in the cluster 1A, the control plane 110A of the master node 100A deploys the transfer pod 210A to each of the worker nodes 200A by using the transfer pod image 210Aa (refer to FIG. 2). In the substitute cluster 1B, the control plane 110B of the master node 100B deploys the transfer pod 210B by using the transfer pod image 210Ba (not illustrated) in each of the worker nodes 200B.

Figure 7:
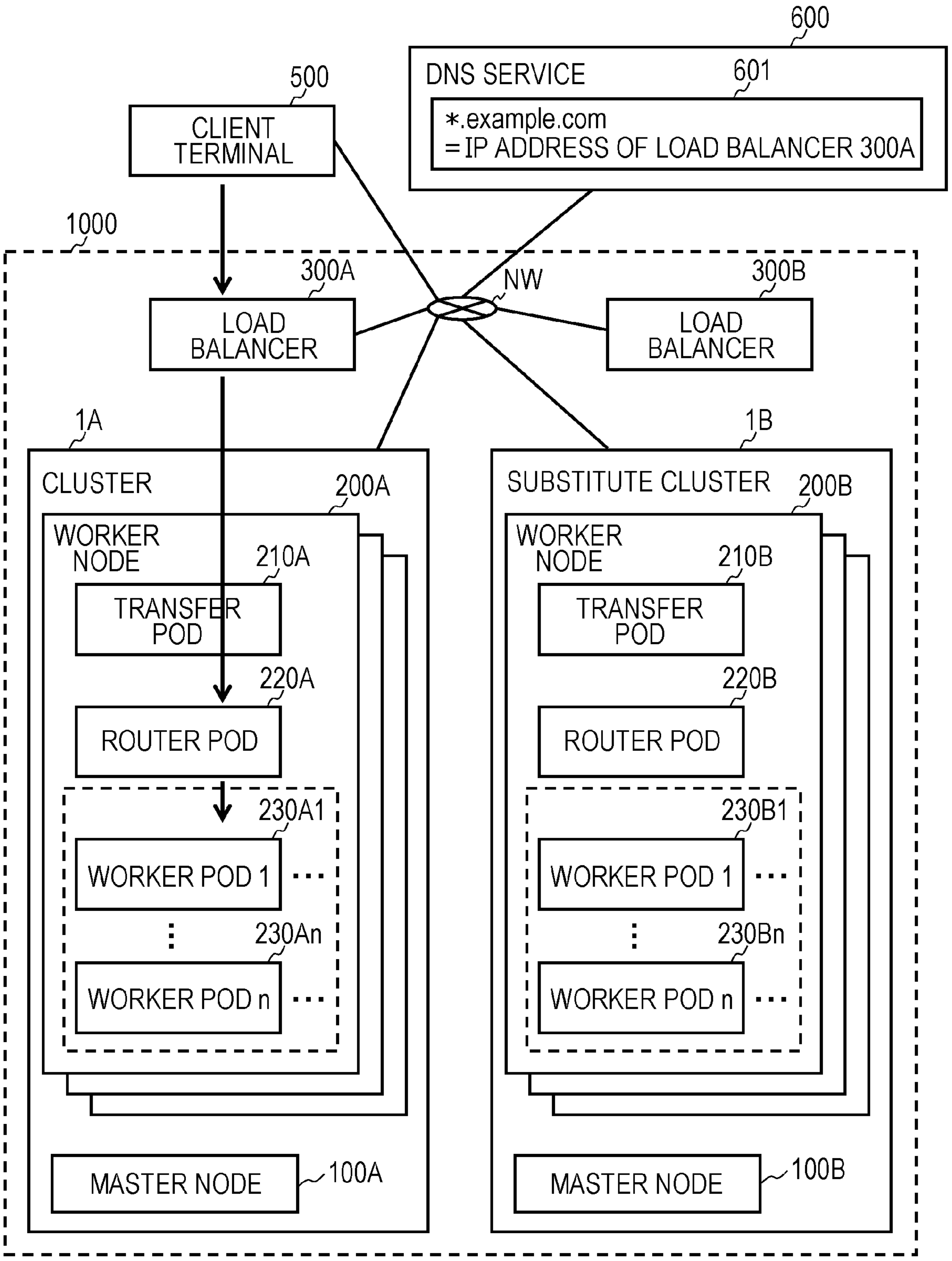
FIG. 7 is an explanatory diagram illustrating a state in which transfer pods are deployed in step S101.

FIG. 7 is an explanatory diagram illustrating a state in which the transfer pods 210A and 210B are deployed in step S101. Here, the request to the worker pod 230A transmitted by the client terminal 500 is received by the load balancer 300A. The load balancer 300A transmits the request to the worker pod 230A to the router pod 220A of the worker node 200A. Here, the transfer pod 210A does not receive the request to the worker pod 230A. The router pod 220A transfers the request to the worker pod 230A to the worker pod 230A. The worker pod 230A executes processing according to the request to the worker pod 230A.

Next, the load balancer 300A and the transfer pod 210A are set such that the router pod 220A receives the request to the worker pod 230A transmitted by the client terminal 500 via the load balancer 300A and the transfer pod 210A, and the load balancer 300B and the transfer pod 210B of the substitute cluster 1B are similarly set (step S102).

Figure 8:
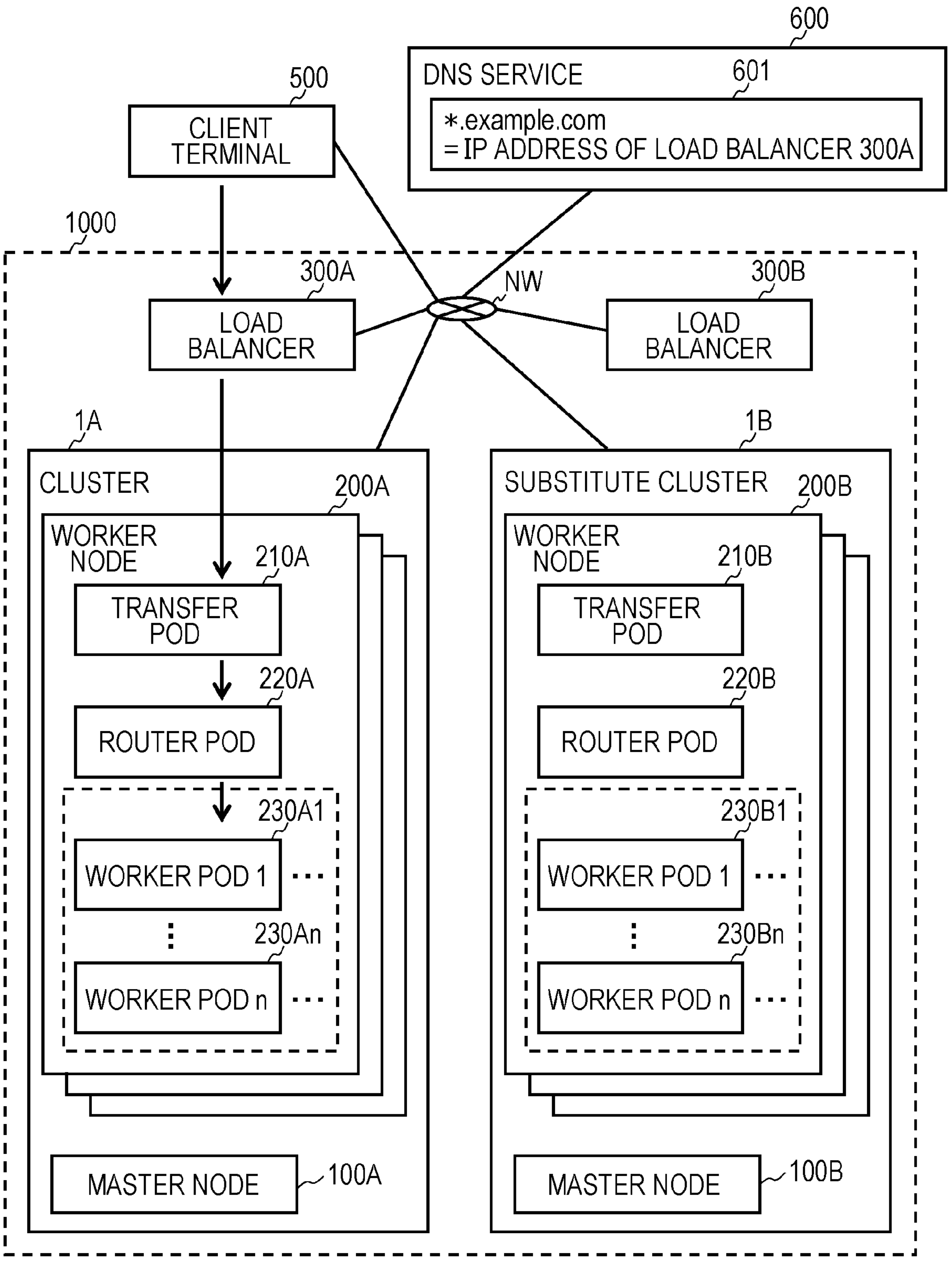
FIG. 8 is an explanatory diagram illustrating a state in which load balancers and router pods are set in step S102.

FIG. 8 is an explanatory diagram illustrating a state in which the load balancers 300A and 300B and the router pods 220A and 220B are set in step S102. In step S102, in the cluster 1A, the control plane 110A of the master node 100A sets the transfer pod 210A such that when the transfer pod 210A receives the request to the worker pod 230A, the transfer pod 210A transmits the received request to the worker pod 230A to the router pod 220A. At this time point, the request to the worker pod 230A transmitted from the client terminal 500 is transmitted to the worker pod 230A via the load balancer 300A and the router pod 220A. Therefore, at this time point, the request to the worker pod 230A is not transmitted to the transfer pod 210A but is transmitted to the worker pod 230A, so that the worker pod 230A can execute processing according to the request to the worker pod 230A.

The control plane 110A of the master node 100A configures the load balancer 300A such that when the load balancer 300A receives the request to the worker pod 230A, the load balancer 300A transmits the received request to the worker pod 230A to the transfer pod 210A. As a result of the above, the request to the worker pod 230A transmitted by the client terminal 500 is transmitted to the worker pod 230A via the load balancer 300A, the transfer pod 210A, and the router pod 220A.

In the substitute cluster 1B, the control plane 110B of the master node 100B sets the transfer pod 210B and the load balancer 300B in the same manner as described above. That is, the control plane 110B of the master node 100B sets the transfer pod 210B such that when the transfer pod 210B receives the request to the worker pod 230A, the transfer pod 210B transmits the received request to the worker pod 230A to the router pod 220B. The master node 100B sets the load balancer 300B such that when the load balancer 300B receives the request to the worker pod 230A, the load balancer 300B transmits the received request to the worker pod 230A to the transfer pod 210B.

Next, in the cluster 1A, the master node 100A sets the transfer pod 210A such that the transfer pod 210A transfers the request to the worker pod 230A to the load balancer 300B (step S103).

Figure 9:
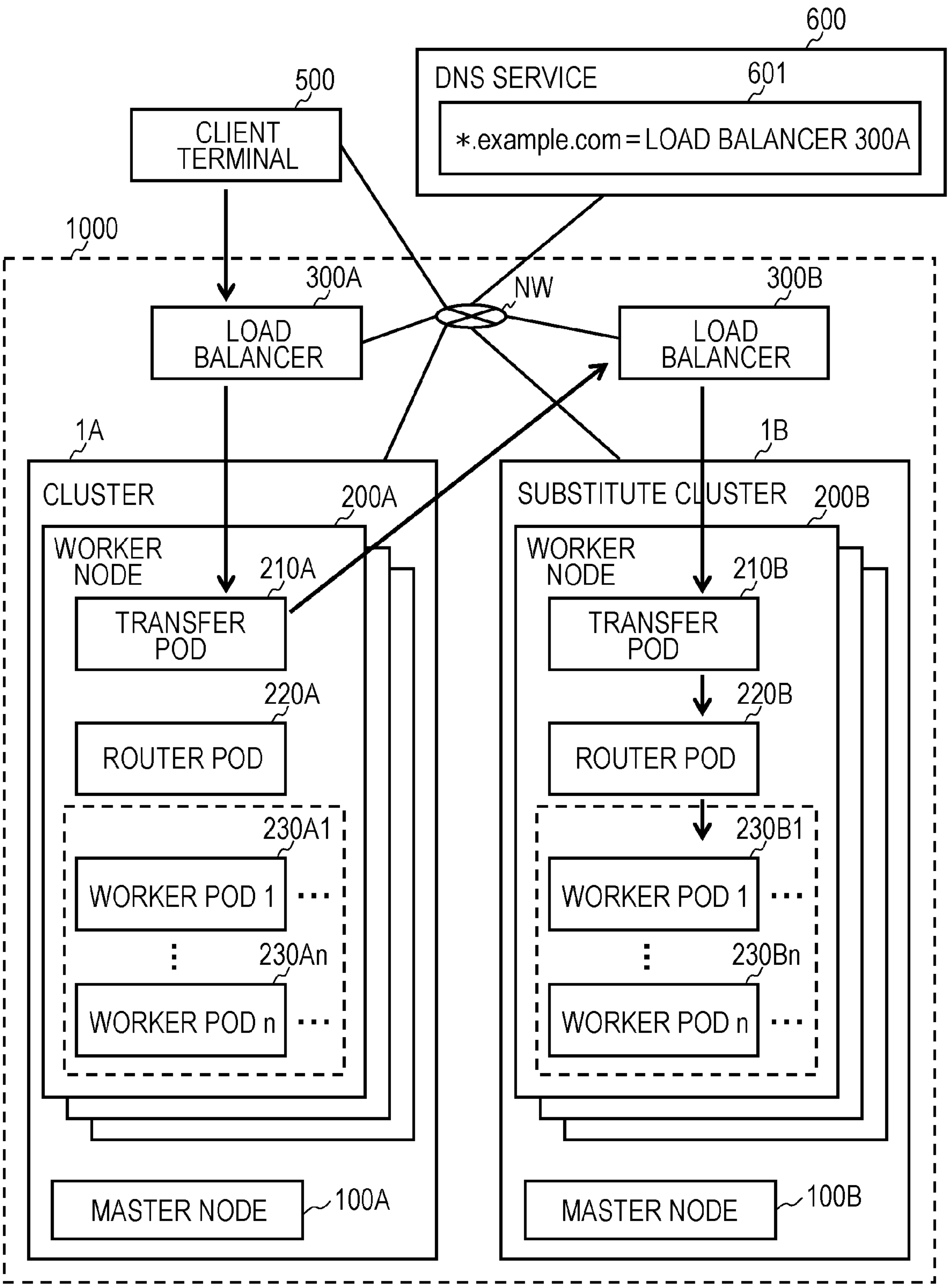
FIG. 9 is an explanatory diagram illustrating a state in which the transfer pod is set in step S103.

FIG. 9 is an explanatory diagram illustrating a state in which the transfer pod 210A is set in step S103. As illustrated in FIG. 9, the request to the worker pod 230A transmitted by the client terminal 500 is transferred to the worker pod 230B of the substitute cluster 1B via the load balancer 300A, the transfer pod 210A, the load balancer 300B, the transfer pod 210B, and the router pod 220B. The worker pod 230B executes processing according to the request to the worker pod 230A.

Next, in each of the worker nodes 200B of the substitute cluster 1B, the transfer pod 210B determines whether there is a problem in execution of a substitute program included in the worker pod 230 (step S104). The substitute program is a program of the worker pod 230B executed in response to the request to the worker pod 230A. In a case where it is determined that there is a problem in the execution of the substitute program (step S104: Yes), the process proceeds to step S105, and the use of the substitute cluster 1B is stopped in the following step S106. On the other hand, in a case where it is determined that there is no problem in the execution of the substitute program (step S104: No), the process proceeds to step S107.

In a case where at least one of the following two conditions is satisfied, the transfer pod 210B determines that there is a problem in the execution of the substitute program included in the worker pod 230 (step S204: Yes). In a case where neither of the following two conditions are satisfied, the transfer pod 210B determines that there is no problem in the execution of the substitute program included in the worker pod 230 (step S104: No).

(Condition 1) A case where the frequency of errors generated by executing the program (substitute program) of the worker pod 230B is more than a predetermined error frequency upper limit value. In this case, there is a problem in the worker pod 230B of the substitute cluster 1B. As described above with reference to FIG. 3, the monitoring unit 215 of each of the transfer pods 210B acquires the frequency of errors in the worker pods 230B1 to 230Bn (all the worker pods 230B) of the worker node 200B in which the monitoring unit 215 is present. Here, the frequency of errors in each of the worker pods 230B1 to 230Bn (all the worker pods 230B) is an error frequency of the substitute program included in each of the worker pods 230B1 to 230Bn (all the worker pods 230B). The monitoring unit 215 determines that there is a problem in the execution of the substitute program in a case where the acquired error frequency (the error frequency of the substitute program) is more than the predetermined error frequency upper limit value. In a case where at least one monitoring unit 15 among the monitoring units 15 of the worker pod 230B1 to 230Bn determines that there is a problem in the execution of the substitute program, it is determined that "there is a problem in the execution of the substitute program".

(Condition 2) A case where a transfer speed of the request to the worker pod 230A (a request to the target program) transferred from the cluster 1A to the substitute cluster 1B is more than a predetermined data transfer speed upper limit value. As described above with reference to FIG. 3, the monitoring unit 215 of the transfer pod 210B regards the data amount of the request to the worker pod 230A stored in the request queue of the queue unit 212 as a transfer speed of the request to the worker pod 230A (a request to the target program) transferred from the cluster 1A to the substitute cluster 1B. In a case where the data amount of the request to the worker pod 230A stored in the queue unit 212 is more than the predetermined data transfer speed upper limit value, the monitoring unit 215 can consider that the worker pods 230B1 to 230Bn (all the worker pods 230B) cannot complete processing according to the request to the worker pod 230A, and thus the monitoring unit 215 determines that there is a problem in the execution of the substitute program. Here, among the monitoring units 15 of the worker pod 230B1 to 230Bn, all the monitoring units 15 determine whether there is a problem in the execution of the substitute program at predetermined time intervals. In a case where at least one monitoring unit 15 among the monitoring units 15 of the worker pods 230B1 to 230Bn determines that there is a problem in the execution of the substitute program during the predetermined time interval, it is determined that "there is a problem in the execution of the substitute program".

Next, the proxy unit 214 of the transfer pod 210B of the substitute cluster 1B transmits transfer stop information including information indicating that the transfer is to be stopped to the transfer pod 210A of the cluster 1A (step S105). The process in step S105 is a process executed in a case where the transfer pod 210B determines in step S104 that there is a problem in execution of the substitute program included in the worker pod 230B (step S104: Yes). In step S105, the proxy unit 214 of the transfer pod 210B of the substitute cluster 1B transmits transfer stop information including information indicating that the transfer is to be stopped to the control plane 110A of the master node 100A of the cluster 1A. Upon receiving the transfer stop information, the control plane 110A transmits the transfer stop information to the transfer pod 210A of each of the worker nodes 200A.

Next, upon receiving the transfer stop information from the control plane 110A, the transfer pod 210A of each of the worker nodes 200A of the cluster 1A is set to transfer the request to the worker pod 230A received by the transfer pod 210A to the router pod 220A, stops transferring the request to the worker pod 230A received by the transfer pod 210A to the load balancer 300B (substitute cluster 1B), and ends the process (step S106). As a result, as described above with reference to FIG. 8, the request to the worker pod 230A is transmitted to the worker pod 230A via the load balancer 300A, the transfer pod 210A, and the router pod 220A.

In a case where the transfer pod 210B of the worker node 200B determines that there is a problem in the execution of the substitute program through the processes from step S104 to step S106 described above (step S104: Yes), the transfer of the request to the worker pod 230A from the cluster 1A to the substitute cluster 1B is stopped. The worker pods 230A1 to 230An (all the worker pods 230A) of the worker node 200A of the cluster 1A execute processing according to the request to the worker pod 230A.

Next, the DNS record 601 of the DNS server 600 is changed such that the domain name of the cluster 1A is associated with the IP address of the substitute cluster 1B (step S107). That is, among the transfer pods 210B of the substitute cluster 1B, at least one transfer pod 210B transmits, to the DNS server 600, DNS record update information including information indicating that the DNS record 601 stored in the DNS server 600 has been rewritten to a DNS record in which the IP address of the substitute cluster 1B is associated with the domain name of the cluster. Upon receiving the DNS record update information, the DNS server 600 changes the DNS record 601 such that the domain name of the cluster 1A is associated with the IP address of the substitute cluster 1B.

Through the process of changing the DNS record 601 (the record in which domain name of cluster 1A and IP address are stored in association with each other) in step S107, the client terminal 500 changes a transmission destination to which the request to the worker pod 230A is to be transmitted from the cluster 1A to the substitute cluster 1B. As a result, a cluster that executes processing for the request to the worker pod 230A of the cluster 1A is switched from the cluster 1A to the substitute cluster 1B.

However, since there are many DNS servers as the DNS server 600, it is not easy to immediately change the DNS records 601 of all the DNS servers. Even if the client terminal 500 transmits the request (including the domain name of the cluster 1A) to the worker pod 230A, until the change of the DNS records 601 of all the DNS servers is completed, there is a possibility that the client terminal accesses the cluster 1A with reference to the DNS record 601 of the DNS server of which the DNS record 601 has not been changed. Therefore, by executing the process in step S107, even if the client terminal 500 changes a transmission destination to which the request to the worker pod 230A is to be transmitted from the cluster 1A to the substitute cluster 1B, switching from the cluster 1A to the substitute cluster 1B is not completed until the change of the DNS records 601 of all the DNS servers is completed.

On the other hand, after the process in step S103 is executed, the transfer pod 210A transfers the requests to all the worker pods 230A transmitted to the cluster 1A to the substitute cluster 1B. Therefore, by executing the process in step S103, the cluster that executes processing for the request to the worker pod 230A can be immediately switched from the cluster 1A to the substitute cluster 1B.

In step S103, the cluster that executes the processing for the request to the worker pod 230A is immediately switched from the cluster 1A to the substitute cluster 1B, and then in step S104, in a case where it is determined that there is no problem in execution of the substitute program for the worker pod 230 (step S104: No), the process in step S107 is executed. Through the process in step S107, the client terminal 500 changes a transmission destination to which the request to the worker pod 230A is to be transmitted from the cluster 1A to the substitute cluster 1B. Thus, after the required time (for example, several tens of minutes) has elapsed after the process in step S107, the transfer pod 210A does not need to transfer the request to the worker pod 230A.

In a case where it is determined that there is no problem in the execution of the substitute program of the worker pod 230 (step S104: No), instead of changing the DNS record 601 of the DNS server 600, the transfer of the request to the worker pod 230A of the worker pod 230A is stopped in steps S105 and S106, so that the cluster that executes the processing for the request to the worker pod 230A by using the worker pod 230A is switched from the substitute cluster 1B to the cluster 1A (steps S105 and S106). Here, by changing the settings of the transfer pod 210A and the transfer pod 210B, switching from the substitute cluster 1B to the cluster 1A is performed, and thus the switching can be completed relatively quickly.

Figure 10:
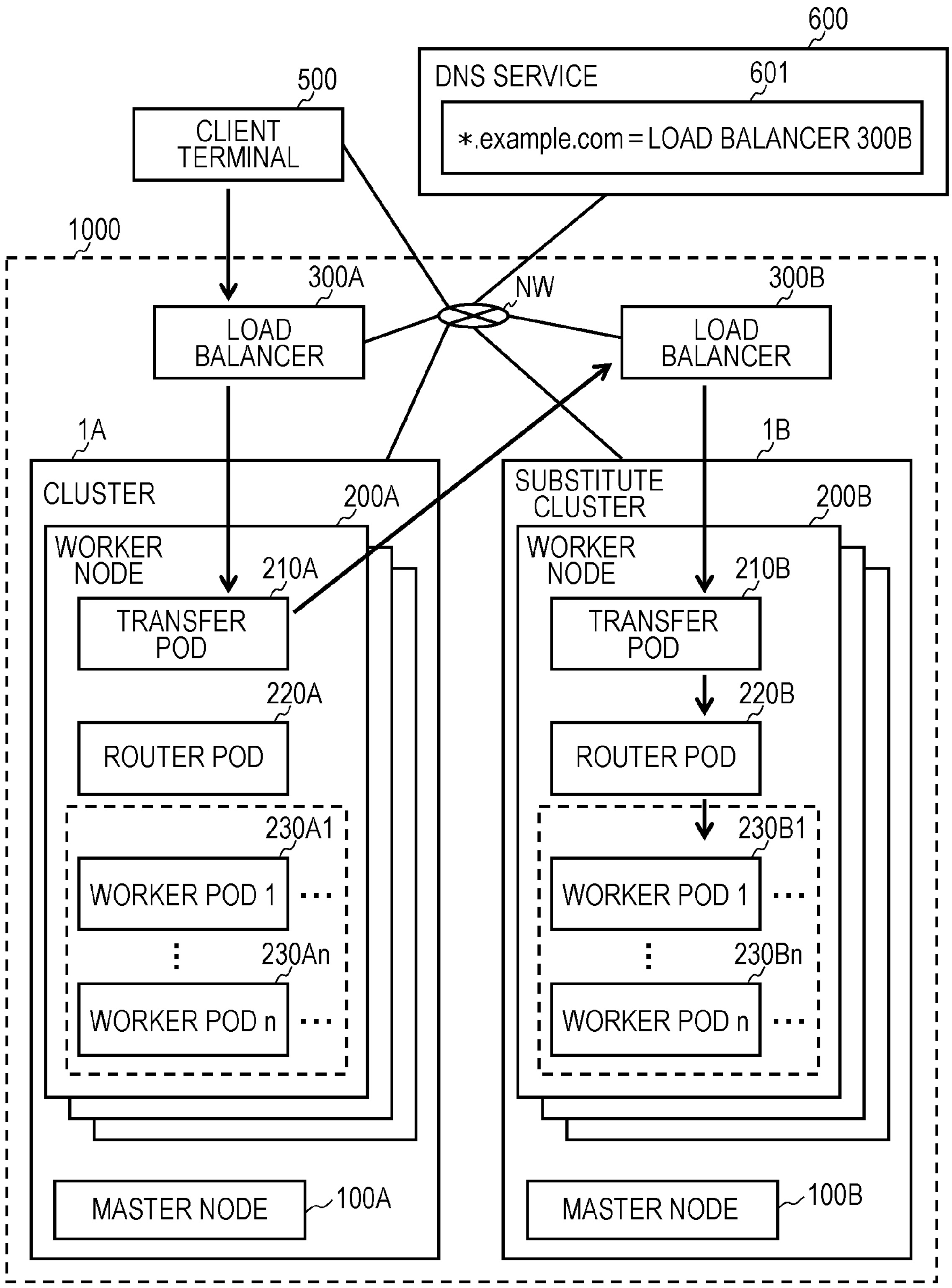
FIG. 10 is an explanatory diagram illustrating a state in which a DNS server is set in step S107.

FIG. 10 is an explanatory diagram illustrating a state in which the DNS server 600 is set in step S107. As illustrated in FIG. 10, the DNS record 601 of the DNS server 600 stores information in which the domain name of the cluster 1A is associated with the IP address of the substitute cluster 1B.

Next, it is determined whether the cluster 1A has received the request to the worker pod 230 (step S108). In a case where it is determined that the cluster 1A has received the request to the worker pod 230 (step S108: Yes), the process proceeds to step S109. On the other hand, in a case where it is determined that the cluster 1A has not received the request to the worker pod 230 (step S108: No), the process proceeds to step S110, and the transfer pods 210A and 210B of the clusters 1A and 1B are deleted.

Here, at least one monitoring unit 215 (refer to FIG. 3) of the worker pod 230A1 to 230An (all the worker pods 230A) of the cluster 1A monitors the load balancer 300A to acquire a data amount of the request to the target program transmitted from the client terminal 500 to the load balancer 300A (cluster 1A) during a predetermined time interval. The monitoring unit 215 determines that the cluster 1A has not received the request to the worker pod 230 in a case where the acquired data amount of the request to the target program transmitted from the client terminal 500 to the load balancer 300A (cluster 1A) is less than a predetermined data transmission amount lower limit value. On the other hand, the monitoring unit 215 determines that the cluster 1A has received the request to the worker pod 230 in a case where the acquired data amount of the request to the target program transmitted from the client terminal 500 to the cluster 1A is equal to or more than the predetermined data transmission amount lower limit value.

Next, the monitoring unit 215 of the transfer pod 210A of the cluster 1A waits for a predetermined time and executes the process in step S108 (step S109). Here, by repeating the processes in steps S108 and S109, it is determined whether the request to the worker pod 230 has been received in step S108 every predetermined time until it can be determined that the cluster 1A has not received the request to the worker pod 230 (step S108: No).

Next, the settings of the load balancers 300A and 300B are returned, the transfer pod 210A of the cluster 1A and the transfer pod 210B of the substitute cluster 1B are deleted, and the process is ended (step S110). That is, the master node 100A of the cluster 1A sets the load balancer 300A such that when the load balancer 300A receives the request to the worker pod 230A, the load balancer 300A transmits the received request to the worker pod 230A to the router pod 220A. Similarly, the control plane 110B of the master node 100B of the substitute cluster 1B sets the load balancer 300B.

Figure 11:
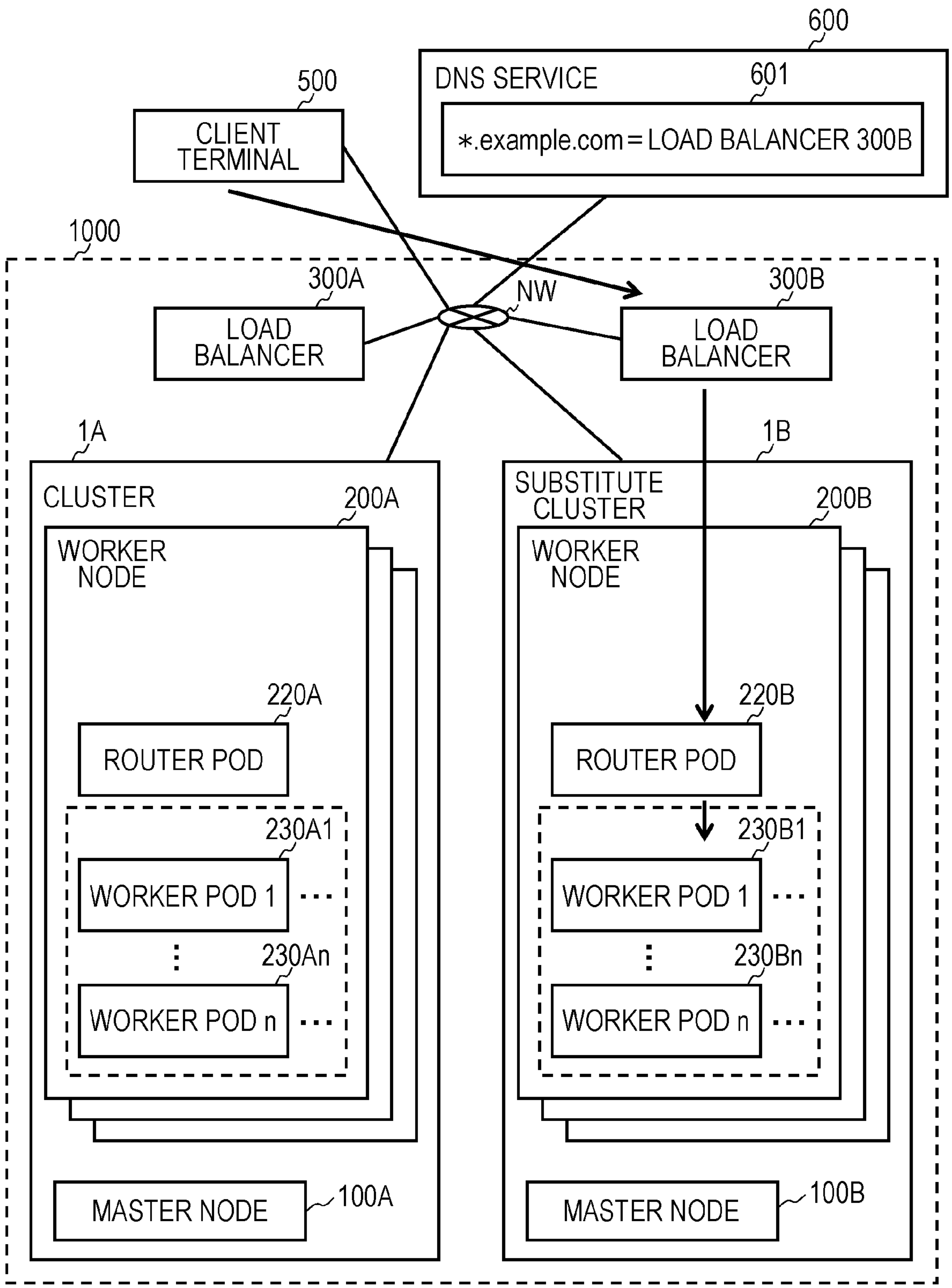
FIG. 11 is an explanatory diagram 11 illustrating a state in which the load balancers are set and the transfer pod and the transfer pod are deleted in step S110.

FIG. 11 is an explanatory diagram illustrating a state in which the load balancers 300A and 300B are set and the transfer pod 210A and the transfer pod 210B are deleted in step S110. As illustrated in FIG. 11, the request to the worker pod 230A transmitted by the client terminal 500 is transmitted to the worker pod 230B via the load balancer 300B and the router pod 220B.

Through the process in steps S108 and S110 described above, the processor of the worker node 200 acquires the data amount of the request to the target program transmitted from the client terminal 500 to the cluster 1A during a predetermined time interval, and deletes the transfer pod in a case where the acquired data amount of the request to the target program transmitted from the client terminal 500 to the cluster 1A is less than the predetermined data transmission amount lower limit value.

In FIGS. 9 and 10, the transfer pod 210A executes the following request transfer process through the process in step S103. That is, in the request transfer process, in a case where the program (substitute program) of at least one worker pod 230B stored in the substitute cluster 1B is executed in place of the program (target program) of at least one worker pod 230A stored in the cluster 1A, when the request to the worker pod 230A (a request to the target program) transmitted from the client terminal 500 is acquired, the request to the worker pod 230A (a request to the target program) is transferred to the substitute cluster 1B to execute the program (substitute program) of the worker pod 230B according to the request to the worker pod 230A (a request to the target program).

The process in step S104 includes the following substitute program determination process. That is, in the substitute program determination process, in step S104, the transfer pod 210B executes a process of determining whether there is a problem in execution of the program (substitute program) of the worker pod 230B of the substitute cluster 1B.

The process in step S104 includes the following first substitute program problem detection process. That is, in the first substitute program problem detection process, in step S104, in a case where the frequency of errors in the worker pod 230B (the error frequency of the substitute program of the worker pod 230B) is more than a predetermined error frequency upper limit value, it is determined that there is a problem in execution of the substitute program of the worker pod 230B.

The process in step S104 includes the following second substitute program problem detection process. That is, in the second substitute program problem detection process, in step S104, in a case where a transfer speed of the request to the worker pod 230A (a request to the target program) transferred from the cluster 1A to the substitute cluster 1B is more than the predetermined data transfer speed upper limit value, it is determined that there is a problem in execution of the substitute program of the worker pod 230B.

The process in step S107 includes the following DNS record change process. That is, in the DNS record change process, in step S107, the transfer pod 210B transmits, to the DNS server 600, DNS record update information including information indicating that the DNS record 601 stored in the DNS server 600 has been rewritten to the DNS record 601 in which the IP address of the substitute cluster 1B is associated with the domain name of the cluster 1A.

The process in step S105 includes the following transfer stop request process. That is, in the transfer stop request process, in a case where it is determined that there is a problem in the execution of the program (substitute program) of the worker pod 230B of the substitute cluster 1B (step S104 in the flowchart of FIG. 6: Yes), transfer stop information including information indicating that the transfer is to be stopped is transmitted to the transfer pod 210A of the cluster 1A.

The process in step S106 includes the following transfer stop process. That is, in the transfer stop process, upon receiving the transfer stop information, the transfer pod 210A (processor 21) of the cluster 1A stops the transfer of the request to the worker pod 230A (the execution of the request transfer process of transferring the request to the target program to the substitute cluster).

The process in steps S108 and S110 includes the following transfer pod deletion process. That is, in the transfer pod deletion process, in steps S108 and S110, a data amount of the request to the worker pod 230A (a request to the target program) transmitted from the client terminal 500 to the cluster 1A is acquired during a predetermined time interval (step S108). In a case where the acquired data amount of the request to the worker pod 230A (a request to the target program) transmitted from the client terminal 500 to the cluster 1A is less than a predetermined data transmission amount lower limit value, the transfer pod is deleted (step S110).

(B) Procedure of Switching the Worker Pod 230Ax of the Cluster 1A to the Worker Pod 230B of the Substitute Cluster 1B, FIGS. 12 to 16

In (A) the procedure of switching the cluster 1A to the substitute cluster 1B described above with reference to FIGS. 6 to 11, switching is performed in units of clusters. (B) The case of switching the worker pod 230Ax of the cluster 1A to the worker pod 230B of the substitute cluster 1B described below is a case of performing switching in units of the worker pod 230 (program). In the following description and drawings in this case, among the worker pods 230 of the cluster 1A, the worker pod 230Ax is switched to the worker pod 230Bx of the substitute cluster 1B. That is, the worker pod 230Ax is the worker pod 230 that is a switching source. The worker pod 230Bx is the worker pod 230 that is a switching destination.

(B) Before executing the procedure of switching the worker pod 230Ax of the cluster 1A to the worker pod 230B of the substitute cluster 1B, the setting of the substitute cluster 1B and the deployment of the worker pod 230Bx are completed.

Figure 12:
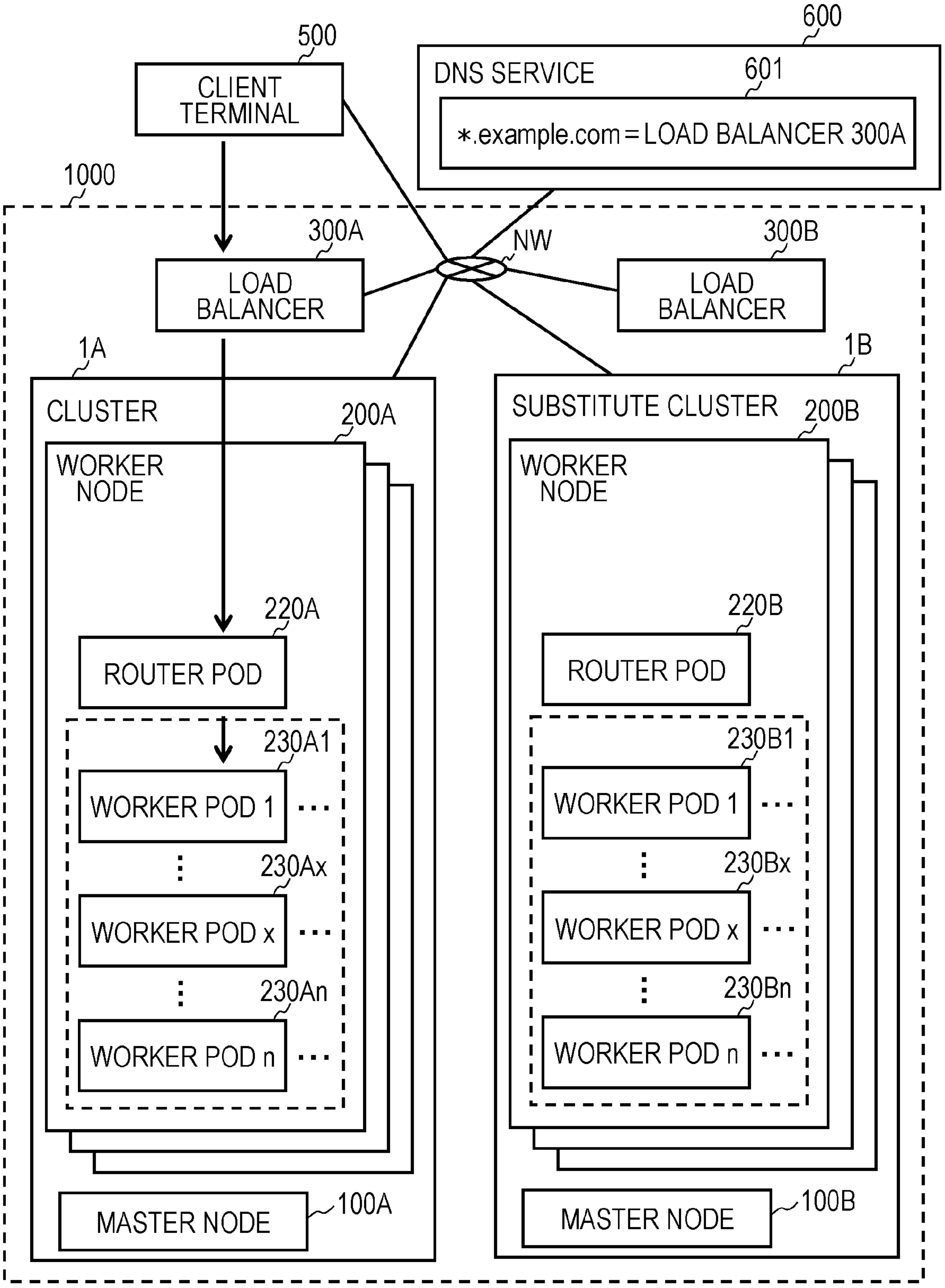
FIG. 12 is an explanatory diagram for describing a configuration in a state (state before switching) before executing (B) a procedure of switching a worker pod of the cluster to a worker pod of the substitute cluster.

FIG. 12 is an explanatory diagram for describing the configuration of the state (state before switching) before the procedure for switching the worker pod 230Ax of the cluster 1A to the worker pod 230B of the substitute cluster 1B is executed (B). As illustrated in FIG. 12, in the state before switching, the transfer pods 210 (transfer pods 210A and 210B) are not created in the cluster 1A and the substitute cluster 1B.

Figure 13:
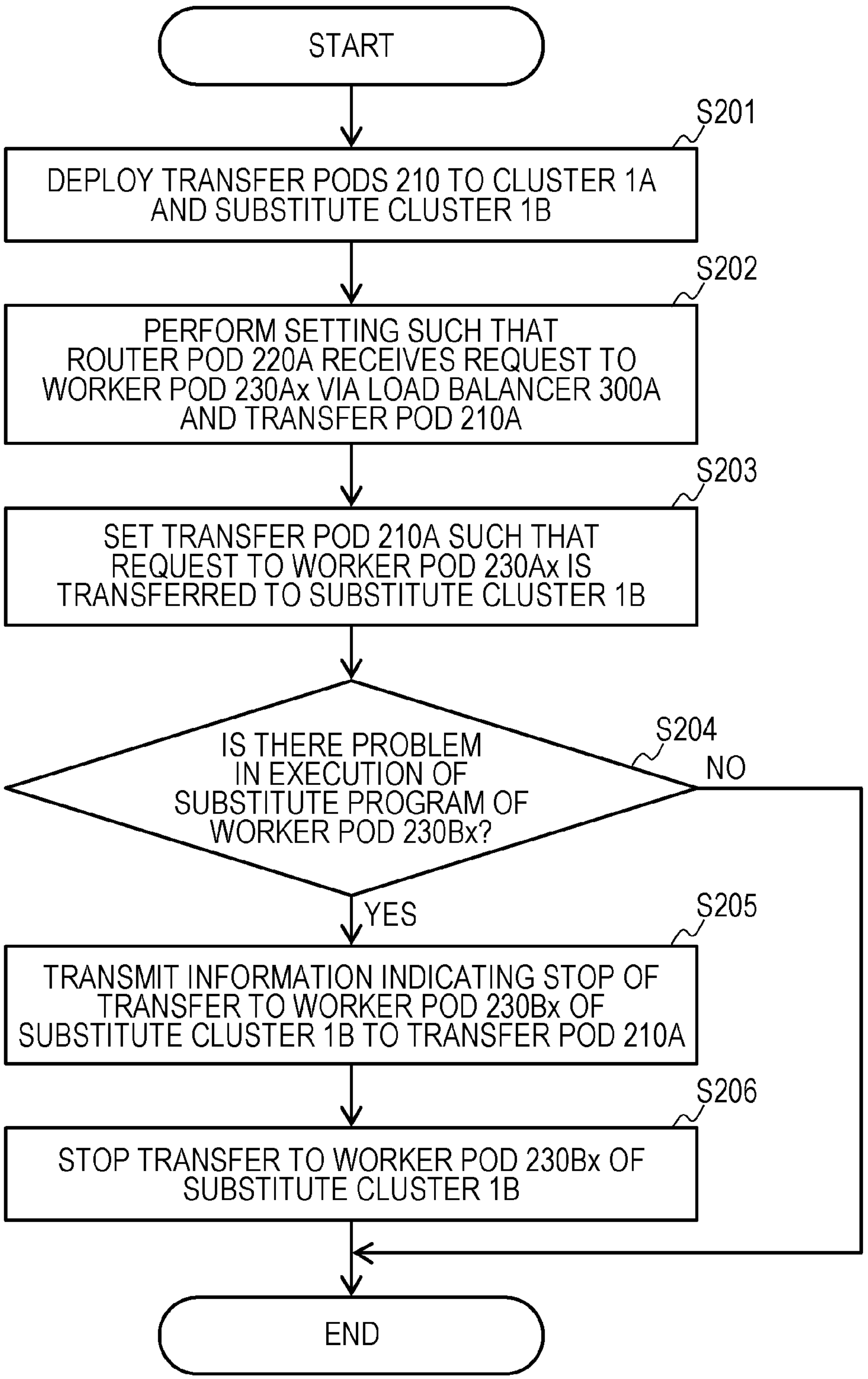
FIG. 13 is a flowchart illustrating an example of (B) the procedure of switching the worker pod of the cluster 1A to the worker pod of the substitute cluster.

FIG. 13 is a flowchart illustrating an example of (B) the procedure of switching the worker pod 230Ax of the cluster 1A to the worker pod 230B of the substitute cluster 1B.

First, the transfer pod 210A is deployed to the cluster 1A, and the transfer pod 210B is deployed to the substitute cluster 1B (step S201). That is, in the cluster 1A, the control plane 110A of the master node 100A deploys the transfer pod 210A by using the transfer pod image 210Aa in each of the worker nodes 200A. In the substitute cluster 1B, the control plane 110B of the master node 100B deploys the transfer pod 210B by using the transfer pod image 210Ba in each of the worker nodes 200B.

Figure 14:
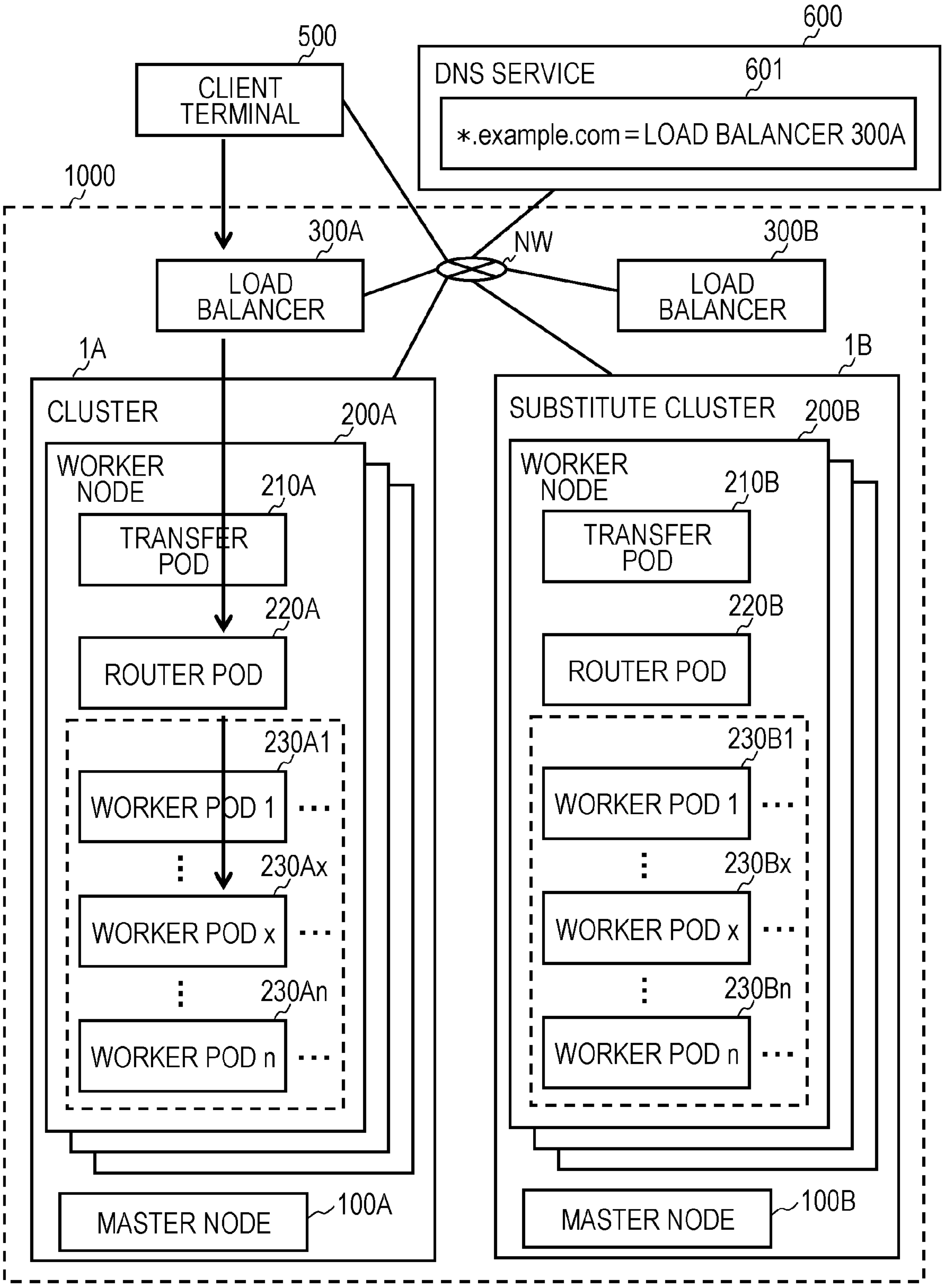
FIG. 14 is an explanatory diagram illustrating a state in which the transfer pods are deployed in step S201.

FIG. 14 is an explanatory diagram illustrating a state in which the transfer pods 210A and 210B are deployed in step S201. Here, a request to the worker pod 230Ax transmitted by the client terminal 500 is received by the load balancer 300A. The load balancer 300A transmits the request to the worker pod 230Ax to the router pod 220A of the worker node 200A. The router pod 220A transfers the request to the worker pod 230Ax to the worker pod 230Ax. The worker pod 230Ax executes processing according to the request to the worker pod 230Ax.

Next, the load balancer 300Ax and the transfer pod 210Ax are set such that the router pod 220Ax receives the request to the worker pod 230Ax transmitted by the client terminal 500 via the load balancer 300Ax and the transfer pod 210Ax, and the load balancer 300Bx and the transfer pod 210Bx of the substitute cluster 1B are similarly set (step S202).

Figure 15:
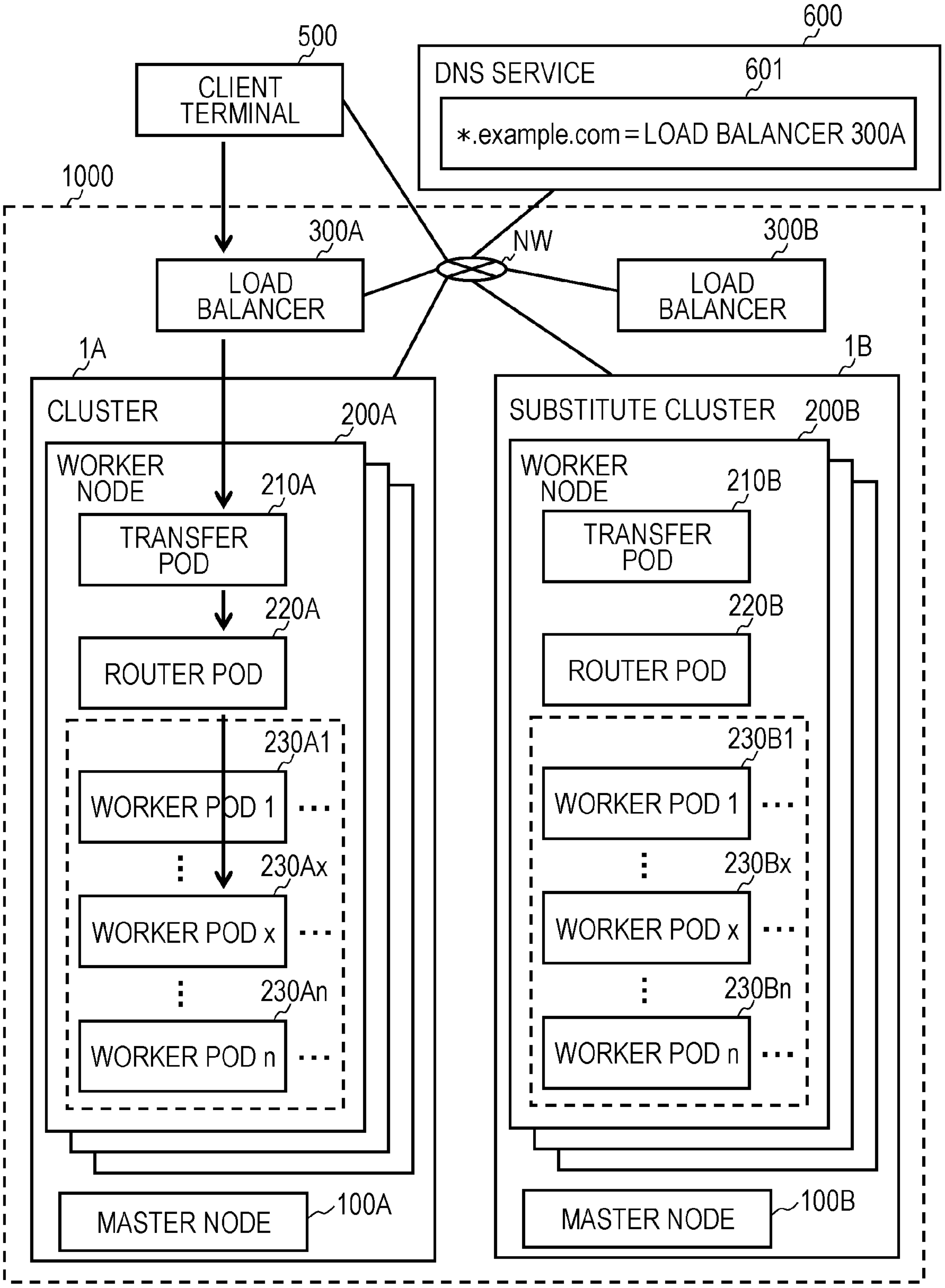
FIG. 15 is an explanatory diagram illustrating a state in which the load balancers and the router pods are set in step S202.

FIG. 15 is an explanatory diagram illustrating a state in which the load balancers 300A and 300B and the router pods 220A and 220B are set in step S202. In step S202, in the cluster 1A, the control plane 110A of the master node 100A sets the transfer pod 210A such that when the transfer pod 210A receives the request to the worker pod 230Ax, the transfer pod 210A transmits the received request to the worker pod 230Ax to the router pod 220A. At this time point, the request to the worker pod 230Ax transmitted by the client terminal 500 is transmitted to the worker pod 230Ax via the load balancer 300A and the router pod 220A. Therefore, at this time point, the request to the worker pod 230Ax is not transmitted to the transfer pod 210A but is transmitted to the worker pod 230Ax, and thus the worker pod 230Ax can execute processing according to the request to the worker pod 230A.

The control plane 110A of the master node 100A sets the load balancer 300A such that when the load balancer 300A receives the request to the worker pod 230Ax, the load balancer 300A transmits the received request to the worker pod 230Ax to the transfer pod 210A. As a result of the above, the request to the worker pod 230Ax transmitted by the client terminal 500 is transmitted to the worker pod 230Ax via the load balancer 300A, the transfer pod 210A, and the router pod 220A.

In the substitute cluster 1B, the control plane 110B of the master node 100B sets the transfer pod 210B and the load balancer 300B in the same manner as described above. That is, the control plane 110B of the master node 100B sets the transfer pod 210B such that when the transfer pod 210B receives the request to the worker pod 230Ax, the transfer pod 210B transmits the received request to the worker pod 230Ax to the router pod 220B. The master node 100B sets the load balancer 300B such that when the load balancer 300B receives the request to the worker pod 230Ax, the load balancer 300B transmits the received request to the worker pod 230Ax to the transfer pod 210B.

Next, in the cluster 1A, the master node 100A sets the transfer pod 210A such that the transfer pod 210A transfers the request to the worker pod 230Ax to the load balancer 300B (step S203).

Figure 16:
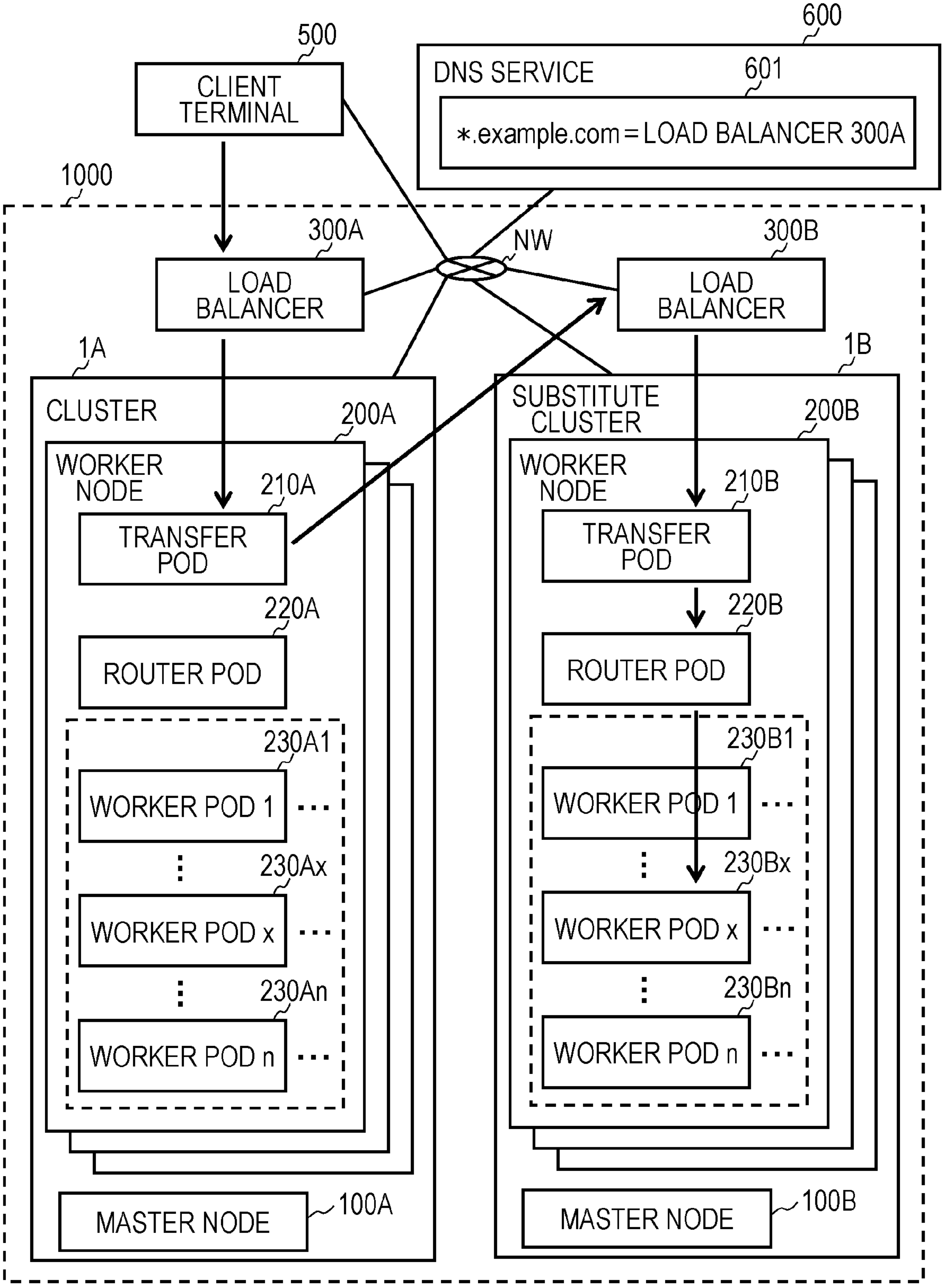
FIG. 16 is an explanatory view 16 illustrating a state in which the transfer pod is set in step S203.

FIG. 16 is an explanatory diagram illustrating a state in which the transfer pod 210A is set in step S203. As illustrated in FIG. 16, the request to the worker pod 230Ax transmitted by the client terminal 500 is transferred to the worker pod 230Bx of the substitute cluster 1B via the load balancer 300A, the transfer pod 210A, the load balancer 300B, the transfer pod 210B, and the router pod 220B. The worker pod 230Bx executes processing according to the request to the worker pod 230Ax.

Next, in each of the worker nodes 200B of the substitute cluster 1B, the transfer pod 210B determines whether there is a problem in execution of the substitute program included in the worker pod 230Bx (step S204). The substitute program is a program of the worker pod 230Bx executed in response to the request to the worker pod 230Ax. In a case where it is determined that there is a problem in the execution of the substitute program (step S204: Yes), the process proceeds to step S205, and the use of the substitute cluster 1B is stopped. On the other hand, in a case where it is determined that there is no problem in the execution of the substitute program (step S205: No), the process is ended.

In a case where at least one of the following two conditions is satisfied, the transfer pod 210B determines that there is a problem in execution of the substitute program included in the worker pod 230Bx (step S204: Yes). In a case where neither of the following two conditions are satisfied, the transfer pod 210B determines that there is no problem in the execution of the substitute program included in the worker pod 230 (step S104: No).

(Condition 1) A case where the frequency of errors generated by executing the program (substitute program) of the worker pod 230Bx is more than a predetermined error frequency upper limit value. In this case, there is a problem in the worker pod 230Bx of the substitute cluster 1B. As described above with reference to FIG. 3, the monitoring unit 215 of each of the transfer pods 210B acquires the frequency of errors in the worker pod 230Bx of the worker node 200B in which the monitoring unit 215 is present. Here, the frequency of errors in the worker pod 230Bx is the error frequency of the substitute program included in the worker pod 230Bx. The monitoring unit 215 determines that there is a problem in the execution of the substitute program in a case where the acquired error frequency (the error frequency of the substitute program) is more than the predetermined error frequency upper limit value. In a case where at least one monitoring unit 15 among the monitoring units 15 of the worker pod 230Bx determines that there is a problem in the execution of the substitute program, it is determined that "there is a problem in the execution of the substitute program".

(Condition 2) A case where a transfer speed of the request to the worker pod 230Ax (a request to the target program) transferred from the cluster 1A to the substitute cluster 1B is more than a predetermined data transfer speed upper limit value. As described above with reference to FIG. 3, the monitoring unit 215 of the transfer pod 210B regards the data amount of the request to the worker pod 230Ax stored in the request queue of the queue unit 212 as a transfer speed of the request to the worker pod 230Ax (a request to the target program) transferred from the cluster 1A to the substitute cluster 1B. In a case where the data amount of the request to the worker pod 230Ax stored in the queue unit 212 is more than the predetermined data transfer speed upper limit value, the monitoring unit 215 can consider that the worker pod 230Bx cannot complete processing according to the request to the worker pod 230Ax, and thus the monitoring unit 215 determines that there is a problem in the execution of the substitute program. Here, among the monitoring units 15 of the worker pod 230Bx, all the monitoring units 15 determine whether there is a problem in execution of the substitute program at predetermined time intervals. In a case where at least one monitoring unit 15 among the monitoring units 15 of the worker pod 230Bx determines that there is a problem in execution of the substitute program during the predetermined time interval, it is determined that "there is a problem in execution of the substitute program".

Next, the proxy unit 214 of the transfer pod 210B of the substitute cluster 1B transmits transfer stop information including information indicating that the transfer is to be stopped to the transfer pod 210A of the cluster 1A (step S205). In step S205, the proxy unit 214 of the transfer pod 210B of the substitute cluster 1B transmits transfer stop information including information indicating that the transfer is to be stopped to the control plane 110A of the master node 100A of the cluster 1A. Upon receiving the transfer stop information, the control plane 110A transmits the transfer stop information to the transfer pod 210A of each of the worker nodes 200A.

Next, upon receiving the transfer stop information from the control plane 110A, the transfer pod 210A of each of the worker nodes 200 of the cluster 1A is set to transfer the request to the worker pod 230Ax received by the transfer pod 210A to the router pod 220A, and stops transferring the request to the worker pod 230Ax received by the transfer pod 210A to the load balancer 300B (substitute cluster 1B), and ends the process (step S206). As a result, as described above with reference to FIG. 8, the request to the worker pod 230Ax is transmitted to the worker pod 230Ax via the load balancer 300A, the transfer pod 210A, and the router pod 220A.

In a case where the transfer pod 210B of the worker node 200B determines that there is a problem in the execution of the substitute program through the processes from step S204 to step S206 described above (step S204: Yes), the transfer of the request to the worker pod 230Ax from the cluster 1A to the substitute cluster 1B is stopped. The worker pod 230Ax of the worker node 200 of the cluster 1A executes processing according to the request to the worker pod 230Ax.

Note that, after executing the process in step S206, the load balancer 300A may be set to transfer the request to the worker pod 230Ax to the router pod 220A, and may further delete the transfer pods 210A and 210B.

In FIG. 16, the transfer pod 210A executes the following request transfer process through the process in step S203. That is, in the request transfer process, in a case where the program (substitute program) of at least one worker pod 230Bx stored in the substitute cluster 1B is executed in place of the program (target program) of at least one worker pod 230Ax stored in the cluster 1A, when a request to the worker pod 230Ax (a request to the target program) transmitted from the client terminal 500 is acquired, the request to the worker pod 230Ax (a request to the target program) is transferred to the substitute cluster 1B such that the program (substitute program) of the worker pod 230Bx is executed according to the request to the worker pod 230Ax (a request to the target program).

The process in step S204 includes the following substitute program determination process. That is, in the substitute program determination process, in step S204, the transfer pod 210B executes a process of determining whether there is a problem in execution of the program (substitute program) of the worker pod 230Bx of the substitute cluster 1B.

The process in step S204 includes the following first substitute program problem detection process. That is, in the first substitute program problem detection process, in step S204, in a case where the frequency of errors in the worker pod 230Bx (the error frequency of the substitute program of the worker pod 230Bx) is more than a predetermined error frequency upper limit value, it is determined that there is a problem in execution of the substitute program of the worker pod 230Bx.

The process in step S204 includes the following second substitute program problem detection process. That is, in the second substitute program problem detection process, in step S204, in a case where a transfer speed of the request to the worker pod 230Ax (a request to the target program) transferred from the cluster 1A to the substitute cluster 1B is more than the predetermined data transfer speed upper limit value, it is determined that there is a problem in execution of the substitute program of the worker pod 230Bx.

The process in step S205 includes the following transfer stop request process. That is, in the transfer stop request process, in a case where it is determined that there is a problem in the execution of the program (substitute program) of the worker pod 230Bx of the substitute cluster 1B (step S204: Yes in the flowchart of FIG. 13), transfer stop information including information indicating that the transfer is to be stopped is transmitted to the transfer pod 210A of the cluster 1A.

The process in step S206 includes the following transfer stop process. That is, in the transfer stop process, upon receiving the transfer stop information, the transfer pod 210A (processor 21) of the cluster 1A stops the transfer of the request to the worker pod 230Ax (the execution of the request transfer process of transferring the request to the target program to the substitute cluster).

Effects of Invention

As described above, in the embodiment, (A) the procedure of switching the cluster 1A to the substitute cluster 1B (refer to FIG. 6) and (B) the procedure of switching the worker pod 230Ax of the cluster 1A to the worker pod 230B of the substitute cluster 1B (refer to FIG. 13) are the cluster management method of the present invention.

The cluster management method includes transferring (refer to step S103 in the flowchart of FIG. 6 and step S203 in the flowchart of FIG. 13) the request to the worker pod 230A (a request to the target program) to the substitute cluster 1B such that the program (substitute program) of the worker pod 230B of the substitute cluster 1B is executed according to the request to the worker pod 230A (a request to the target program).

Here, when the client terminal transmits a request to the worker pod 230A (a request to the target program) to the cluster 1A, the request to the worker pod 230A (a request to the target program) is transferred to the substitute cluster 1B. Therefore, the program (substitute program) of the worker pod 230B stored in the substitute cluster 1B can be reliably used in place of the program of the worker pod 230A stored in the cluster 1A. Therefore, according to the cluster management method of the present invention, it is possible to switch clusters more quickly.

Note that the switching from the program of the cluster 1A to the substitute program of the substitute cluster 1B here may be cluster switching in which all the programs of the cluster 1A are switched to all the programs of the substitute cluster 1B.

In a case where a defect such as a security hole is found in the cluster 1A before switching, it is possible to quickly and reliably perform switching from the cluster 1A to the substitute cluster 1B. As a result, the cluster management method according to the present invention can enhance safety such as reduction in security risk when using a cluster. In a case where a defect is found in the substitute cluster 1B after switching to the substitute cluster 1B, the switching can be promptly canceled (a cluster to be used is rapidly switched from the substitute cluster 1B to the cluster 1A). As a result, it is possible to curb the occurrence of damage due to a defect after switching.

In (A) the procedure of switching the cluster 1A to the substitute cluster 1B (refer to FIG. 6) of the cluster management method of the present invention, requests to the programs of all the worker pods 230A (the requests to the programs of the worker pods) are transferred to the substitute cluster as requests to the target program. In other words, in (A) the procedure of switching the cluster 1A to the substitute cluster 1B (refer to FIG. 6), cluster switching is executed. In the cluster management method of the present invention, the cluster switching can be performed more quickly even in a case where the cluster switching is executed.

In the cluster management method of the present invention, DNS record update information including information indicating that the DNS record 601 stored in the DNS server 600 has been rewritten to a DNS record in which the IP address of the substitute cluster 1B (the IP address of the load balancer 300B) is associated with the domain name of the cluster 1A is transmitted to the DNS server 600. As a result, when the DNS server 600 accepts an inquiry about name resolution for the domain name of the cluster 1A, the DNS server 600 returns the IP address of the substitute cluster 1B with respect to the domain name of the cluster 1A. Therefore, the worker pod 230A (program) of the cluster 1A can be more reliably switched to the worker pod 230B (substitute program) of the substitute cluster 1B.

In the cluster management method of the present invention, in a case where it is determined that there is a problem in the execution of the program (substitute program) of the worker pod 230B of the substitute cluster 1B (step S104 in the flowchart of FIG. 6: Yes), transfer stop information including information indicating that the transfer is to be stopped is transmitted to the transfer pod 210A of the cluster 1A (step S105 in the flowchart of FIG. 6). Upon receiving the transfer stop information, the transfer pod 210A (processor 21) of the cluster 1A stops the transfer of the request to the worker pod 230A (the execution of the request transfer process of transferring the request to the target program to the substitute cluster) (step S106 in the flowchart of FIG. 6). Therefore, the cluster 1A is used in a case where a problem occurs in the substitute cluster 1B. It is possible to suppress an adverse effect caused by the problem occurring in the substitute cluster 1B. The cluster switching can be performed more quickly.

In the cluster management method of the present invention, in a case where a data amount of the request to the worker pod 230A (a request to the target program) transmitted from the client terminal 500 to the cluster 1A is less than a predetermined data transmission amount lower limit value, the transfer pods 210A and 210B are deleted (step S108 and step S110 in the flowchart of FIG. 6). As a result, it is possible to suppress deletion of the transfer pods 210A and 210B when the transfer pods 210A and 210B are necessary. When the transfer pods 210A and 210B are surely unnecessary, the transfer pods 210A and 210B can be deleted.

In the cluster management method, the transfer pods 210A and 210B (transfer pods) transfer the request to the worker pod 230A (a request to the target program) to the substitute cluster 1B such that the program (substitute program) of the worker pod 230B of the substitute cluster 1B is executed according to the request to the worker pod 230A (a request to the target program) (refer to step S103 in the flowchart of FIG. 6 and step S203 in the flowchart of FIG. 13). The transfer pods 210A and 210B (transfer pods) are pods and are thus easily created (deployed) and deleted as necessary. When it is not necessary to use the cluster management method of the present invention, the transfer pods 210A and 210B (transfer pods) can be easily deleted. As a result, in the cluster management method of the present invention, the resources of the cluster can be used with less waste.

The transfer pod image 210Aa (an image of the transfer pods 210A and 210B) can be easily diverted. Therefore, the cluster management method can be easily applied to a new cluster.

In the cluster management method of the present invention, in a case where the frequency of errors in the worker pod 230B (the error frequency of the substitute program of the worker pod 230B) is more than a predetermined error frequency upper limit value, it is determined that there is a problem in execution of the substitute program of the worker pod 230B (step S104 in the flowchart of FIG. 6 and step S204 in the flowchart of FIG. 13). As a result, it is possible to easily detect a defect in a case where the substitute cluster 1B is used as a substitute. It is possible to easily curb a problem at the time of switching clusters.

In the cluster management method of the present invention, in a case where a transfer speed of the request to the worker pod 230A (a request to the target program) transferred from the cluster 1A to the substitute cluster 1B is more than a predetermined data transfer speed upper limit value, it is determined that there is a problem in execution of the substitute program of the worker pod 230B (step S104 in the flowchart of FIG. 6 and step S204 in the flowchart of FIG. 13). As a result, it is possible to easily detect insufficiency of the processing capacity of the substitute cluster 1B in a case where the substitute cluster 1B is used as a substitute. It is possible to easily curb a problem at the time of switching clusters.

Note that the present invention is not limited to the above-described embodiments, and includes various modifications. For example, the configurations of the above-described embodiments have been described in detail in order to describe the present invention in an easy-to-understand manner, and are not necessarily limited to those having all the described configurations. A part of the configuration of each embodiment can be added to, deleted from, or replaced with another configuration.

Some or all of the above-described configurations, functions, processing units, processing means, and the like may be realized by hardware, for example, by being designed with an integrated circuit. The present invention can also be realized by program codes of software that realizes the functions of the embodiments. In this case, a storage medium in which the program codes are recorded is provided to a computer, and a processor included in the computer reads the program codes stored in the storage medium. In this case, the program codes read from the storage medium realize the functions of the above-described embodiments, and the program codes and the storage medium storing the program codes configure the present invention. As a storage medium for supplying such program codes, for example, a flexible disk, a CD-ROM, a DVD-ROM, a hard disk, a solid state drive (SSD), an optical disk, a magneto-optical disk, a CD-R, a magnetic tape, a non-volatile memory card, a ROM, or the like is used.

The program codes for realizing the functions described in the present embodiment can be implemented by a wide range of programs or script languages such as Assembler, C/C++, perl, Shell, PHP, Python, and Java (registered trademark).

The program codes of software that realizes the functions of the embodiments may be distributed via a network to be stored in a storage means such as a hard disk or a memory of a computer or a storage medium such as a CD-RW or a CD-R, and a processor included in the computer may read and execute the program codes stored in the storage means or the storage medium.

In the above-described embodiments, the control lines and the information lines indicate what is considered to be necessary for the description, and do not necessarily indicate all the control lines and the information lines on a product. All the configurations may be connected to each other.

What is claimed is:

1. A cluster management method in a cluster including a plurality of nodes each including a storage unit that stores a program to be executed in response to a request from a client terminal connected to a network and a processor that executes the program, wherein the cluster has at least one worker pod, wherein different IP addresses are assigned to the cluster and a substitute cluster, and wherein a DNS record in which an IP address of the cluster is associated with a domain name of the cluster is stored in a DNS server, the cluster management method of causing the processor to:

in a case where at least one substitute program stored in the substitute cluster is executed as a substitute for at least one target program stored in the cluster, when a request to the target program transmitted from the client terminal is acquired, execute a request transfer process of transferring the request to the target program to the substitute cluster such that the substitute program is executed in response to the request to the target program, wherein in the request transfer process, requests to programs of all the worker pods are transferred to the substitute cluster as requests to the target program; and in a case where the substitute program included in the substitute cluster is executed as a substitute for the target program, execute a DNS record change process of transmitting, to the DNS server, DNS record update information including information indicating that the DNS record stored in the DNS server has been rewritten to a DNS record in which an IP address of the substitute cluster is associated with the domain name of the cluster.

2. The cluster management method according to claim 1, wherein a processor of the substitute cluster is configured to in a case where the substitute program included in the substitute cluster is executed as a substitute for the target program, execute a substitute program determination process of determining whether there is a problem in execution of the substitute program, and execute a DNS record update process in a case where it is determined in the substitute program determination process that there is a problem in the execution of the substitute program, and execute a transfer stop request process of transmitting transfer stop information including information indicating that transfer is to be stopped to the cluster in a case where it is determined in the substitute program determination process that there is a problem in the execution of the substitute program, and the processor of the cluster is further configured to execute a transfer stop process of stopping the execution of the request transfer process of transferring the request to the target program to the substitute cluster when the transfer stop information is received.

3. The cluster management method according to claim 2, wherein the request transfer process is executed by a transfer pod provided in the cluster, and the processor of the cluster is configured to acquire a data amount of the request to the target program transmitted from the client terminal to the cluster during a predetermined time interval, and execute a transfer pod deletion process of deleting the transfer pod in a case where the acquired data amount of the request to the target program transmitted from the client terminal to the cluster is less than a predetermined data transmission amount lower limit value.

4. The cluster management method according to claim 1, wherein the request transfer process is executed by a transfer pod provided in the cluster.

5. The cluster management method according to claim 4, wherein the processor is further configured to:

acquire a data amount of the request to the target program transmitted from the client terminal to the cluster during a predetermined time interval, and execute a transfer pod deletion process of deleting the transfer pod in a case where the acquired data amount of the request to the target program transmitted from the client terminal to the cluster is less than a predetermined data transmission amount lower limit value.

6. The cluster management method according to claim 1, wherein a processor of the substitute cluster is configured to in a case where the substitute program included in the substitute cluster is executed as a substitute for the target program, execute a substitute program determination process of determining whether there is a problem in execution of the substitute program, and in a case where it is determined in the substitute program determination process that there is a problem in the execution of the substitute program, execute a transfer stop request process of transmitting transfer stop information including information indicating that transfer is to be stopped to the cluster, and the processor of the cluster is further configured to execute a transfer stop process of stopping the execution of the request transfer process of transferring the request to the target program to the substitute cluster such that the substitute program is executed in response to the request to the target program when the transfer stop information is received.

7. The cluster management method according to claim 6, wherein the processor of the substitute cluster is configured to acquire a frequency of an error of the substitute program, and execute a first substitute program problem detection process of determining that there is a problem in execution of the substitute program in a case where the acquired frequency of the error of the substitute program is more than a predetermined error frequency upper limit value.

8. The cluster management method according to claim 6, wherein the processor of the substitute cluster is configured to:

acquire a transfer speed of the request to the target program transferred from the cluster to the substitute cluster, and execute a second substitute program problem detection process of determining that there is a problem in execution of the substitute program in a case where the acquired transfer speed of the request to the target program transferred from the cluster to the substitute cluster is more than a predetermined data transfer speed upper limit value.

9. A cluster comprising:

a plurality of nodes including a storage unit that stores a program to be executed in response to a request from a client terminal connected to a network; and a processor that executes the program, wherein the cluster has at least one worker pod, wherein different IP addresses are assigned to the cluster and a substitute cluster, wherein a DNS record in which an IP address of the cluster is associated with a domain name of the cluster is stored in a DNS server, and wherein in a case where at least one substitute program stored in the substitute cluster is executed as a substitute for at least one target program stored in the cluster, when a request to the target program transmitted from the client terminal is acquired, a request transfer process of transferring the request to the target program to the substitute cluster is executed such that the substitute program is executed in response to the request to the target program, wherein in the request transfer process, requests to programs of all the worker pods are transferred to the substitute cluster as requests to the target program, and in a case where the substitute program included in the substitute cluster is executed as a substitute for the target program, a DNS record change process of transmitting, to the DNS server, DNS record update information including information indicating that the DNS record stored in the DNS server has been rewritten to a DNS record in which an IP address of the substitute cluster is associated with the domain name of the cluster is executed.

10. A cluster management program executed by a cluster including a plurality of nodes including a storage unit that stores a program to be executed in response to a request from a client terminal connected to a network and a processor that executes the program, wherein the cluster has at least one worker pod, wherein different IP addresses are assigned to the cluster and a substitute cluster, and wherein a DNS record in which an IP address of the cluster is associated with a domain name of the cluster is stored in a DNS server, the cluster management program causing the processor to:

when a request to a target program transmitted from the client terminal is acquired, execute a request transfer process of transferring the request to the target program to the substitute cluster such that the substitute program is executed in response to the request to the target program, wherein in the request transfer process, requests to programs of all the worker pods are transferred to the substitute cluster as requests to the target program; and in a case where the substitute program included in the substitute cluster is executed as a substitute for the target program, execute a DNS record change process of transmitting, to the DNS server, DNS record update information including information indicating that the DNS record stored in the DNS server has been rewritten to a DNS record in which an IP address of the substitute cluster is associated with the domain name of the cluster.

* * * * *